US007210035B2

(12) United States Patent
Doyle et al.

(10) Patent No.: US 7,210,035 B2
(45) Date of Patent: *Apr. 24, 2007

(54) SYSTEM AND METHOD FOR GRAPHICAL INDICIA FOR THE CERTIFICATION OF RECORDS

(75) Inventors: Michael D. Doyle, Wheaton, IL (US); Robert G. Hamilton, Oak Park, IL (US); Marc C. Perrone, Shorewood, WI (US); Paul F. Doyle, Grand Rapids, MI (US); Glenn W. Bernsohn, Evanston, IL (US)

(73) Assignee: DFS Linkages, Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/271,438

(22) Filed: Nov. 10, 2005

(65) Prior Publication Data

US 2006/0136719 A1    Jun. 22, 2006

Related U.S. Application Data

(63) Continuation of application No. 09/844,790, filed on Apr. 26, 2001, now Pat. No. 7,017,046, which is a continuation-in-part of application No. 09/158,592, filed on Sep. 22, 1998, now Pat. No. 6,381,696.

(60) Provisional application No. 60/200,372, filed on Apr. 28, 2000, provisional application No. 60/200,328, filed on Apr. 28, 2000, provisional application No. 60/059,455, filed on Sep. 22, 1997.

(51) Int. Cl.
*H04L 9/32* (2006.01)

(52) U.S. Cl. ...................... 713/157; 713/178

(58) Field of Classification Search ........ 713/156–158, 713/161, 168, 171, 175–178; 705/50, 60, 705/63, 67, 418
See application file for complete search history.

(56) References Cited

U.S. PATENT DOCUMENTS

| 4,309,569 | A | 1/1982 | Merkle |
| 5,001,752 | A | 3/1991 | Fischer |
| 5,022,080 | A | 6/1991 | Durst et al. |
| 5,136,643 | A | 8/1992 | Fischer |
| 5,136,646 | A | 8/1992 | Haber et al. |
| 5,136,647 | A | 8/1992 | Haber et al. |
| 5,201,000 | A | 4/1993 | Matyas et al. |
| 5,373,561 | A | 12/1994 | Haber et al. |
| RE34,954 | E | 5/1995 | Haber et al. |
| 5,422,953 | A | 6/1995 | Fischer |
| 5,469,507 | A | 11/1995 | Canetti et al. |
| 5,673,316 | A | 9/1997 | Auerbach et al. |
| 5,781,629 | A | 7/1998 | Haber et al. |
| 5,787,172 | A | 7/1998 | Arnold |
| 5,864,667 | A | 1/1999 | Barkan |
| 6,671,813 | B2 | 12/2003 | Ananda |
| 6,711,679 | B1 | 3/2004 | Guski et al. |

FOREIGN PATENT DOCUMENTS

| EP | 96300340.5 | 8/1996 |
| EP | 96105258.6 | 10/1996 |
| WO | WO 99/16209 A1 | 4/1999 |

OTHER PUBLICATIONS

Verisign Digital ID Center Digital IDs Frequently Asked Questions, [online], [retrieved on Sep. 8, 1998], Copyright 1997, Retrieved from the internet <URL: http://digitalid.verisign.com/id_faques.htm, pp. 1-19.
Digital Signature Trust Company Resources, [online], [retrieved on Sep. 8, 1998], Copyright 1997, Retrieved from the internet <URL: http://www.digsigtrust.com/resources/pkc.html, pp. 1-2, pp. 1-26.
RSA Crytology Today FAQ (3/3), [online], [retrieved on Sep. 8, 1998], Copyright 1993, Retrieved from the internet <URL: http://www.cis.ohio-state.edu/hypertext/faq/usenet/cryptography-faq/rsa/part3/faq.html, pp. 1-17.
H. Massias and J.-J. Quisquater, Time and Cryptography, UCL Universite Catholique de Louvain, Mar. 1997, pp. 1-18, TIMESEC Technical Report WP1.
A. Shamir, RSA for Paranoids, RSA Laboratories' CryptoBytes, Autumn 1995, vol. 1, No. 3, http://citeseer.ist.psu.edu/shamir95rsa.html (pp. 14-15).
D. Bayer, S. Haber, and W.S. Stornetta, Improving the Efficiency and Reliability of Digital Time-Stamping, Sequences II: Methods in Communication, Security, and Computer Science, Mar. 1992, pp. 329-334, Springer Verlag.
S. Haber and W.S. Stornetta, How to Time-Stamp a Digital Document, Journal of Cryptology, pp. 99-111, 1991, vol. 3, No. 2.

*Primary Examiner*—Kim Vu
*Assistant Examiner*—Thomas Gyorfi
(74) *Attorney, Agent, or Firm*—Sonnenschein Nath & Rosenthal LLP

(57) ABSTRACT

A system and method for authenticating records. Certification information may be encoded in graphical form. This graphical form, or design, may be referred to as an "Indicia." The record at issue may be printed out by a computer or stored electronically and bear on it an indicia that relates to the authenticity of the document. The indicia (and record) may then be scanned and interpreted by the computer to authenticate the record.

2 Claims, 25 Drawing Sheets xxxx yyyy zzzz
xxxx yyyy zzzz
aaa          bbb
aaa          bbb
ccc          ddd
ccc          ddd
eee fffff gggg
eee fffff gggg
hhh
hhh
iiiiiiii
iiiiiiii
kkk
kkk

FIG. 23

SYSTEM AND METHOD FOR GRAPHICAL INDICIA FOR THE CERTIFICATION OF RECORDS

CROSS-REFERENCES TO RELATED APPLICATIONS

This application is related to co-pending U.S. patent application Ser. No. 09/844,066, entitled "System and Method for Widely Witnessed Proof of Time," filed Apr. 26, 2001. This application is a Continuing Application under 37 C.F.R. § 1.53(b) of U.S. patent application Ser. No. 09/844,790, filed Apr. 26, 2001 now U.S. Pat. No. 7,017,046, which in turn claims priority under 37 C.F.R. § 1.78 as a continuation-in-part of U.S. patent application Ser. No. 09/158,592, filed Sept. 22, 1998, entitled "Method and System for Transient Key Digital Time Stamps," now issued as U.S. Pat. No. 6,381,696 B1, which in turn claims priority under 35 U.S.C. § 119(e) from U.S. Provisional Patent Application Ser. No. 60/059,455, filed Sept. 22, 1997, entitled "Method and System for Transient Key Digital Time Stamps." U.S. patent application Ser. No. 09/158,592 and U.S. Provisional Patent Application Ser. No. 60/059,455 filed Sept. 22, 1997 are hereby incorporated herein by reference in their entirety. U.S. patent application Ser. No. 09/844,790 also claims priority under 35 U.S.C. § 119(e) from U.S. Provisional Patent Application Ser. No. 60/200,328, filed Apr. 28, 2000, entitled "System and Method for Graphical Indicia for the Certification of Records," and from U.S. Provisional Patent Application Ser. No. 60/200,372, filed Apr. 28, 2000, entitled "System and Method for Widely Witnessed Proof of Time," the entirety of both of which are hereby incorporated herein by reference in their entirety.

BACKGROUND OF THE INVENTION

Cryptology is the science of secret writing and has been used for millennia to transmit information from one party to another without allowing intermediaries to learn the information. Cryptology includes cryptography, which is the encoding of information, and cryptanalysis, which is the decoding of the information. Often, people use cryptography to include both cryptography and cryptanalysis.

In cryptology, an original message, in plaintext, is desired to be sent from one party to another. The text is encrypted using an algorithm or cipher, and the result is called ciphertext.

Usually a key is used as part of the input to the algorithm, to vary the results of the algorithm and make the ciphertext more difficult to decipher, or turn back into plaintext. Symmetric encryption uses a single key to both encrypt the plaintext and decrypt the ciphertext. Asymmetric encryption uses two separate keys, one to encrypt, and one to decrypt. These two keys have a mathematical relationship that allows what is encrypted with one key to be decrypted only with the other key. Because of the nature of the mathematical relationship between the two keys, it takes longer to compute the encryption and decryption of information using asymmetric encryption.

Public key cryptography uses asymmetric encryption, where one key is made public, and the other is kept private. This is also referred to as a public/private key pair. A message sender may publish its public key, and anyone can use it to encrypt information. The sender will be the only one who can decrypt the information, using a private key. A second benefit to asymmetric encryption is that data can be encrypted with a private key, which anyone knowing the sender's public key can then decrypt, creating a digital signature that is unique. Digital signatures can also be referred to as digital certificates. Often, a third-party Certificate Authority ("CA") is relied upon to authenticate a particular record. The system of using public and private keys and a CA is frequently referred to as the Public Key Infrastructure ("PKI").

Another aspect of cryptology is the message-digest algorithm. A message-digest algorithm takes any amount of plaintext and produces a fixed-length ciphertext, which is referred to as the message digest, digest, or hash. A strong message-digest algorithm produces a unique digest for each input, such that if only one character of the plaintext changes the new digest is different.

The security of an algorithm used to encrypt information is based on whether or not it is considered possible to crack the ciphertext and find the plaintext. The larger the key used with the algorithm, the more secure the data.

Cryptanalysts traditionally break ciphers by finding patterns within the data or by learning the key. Having more examples of ciphertext created with the same key increases the chance of finding patterns within the resulting data. Most algorithms are published in order to undergo public scrutiny to see if there are any weaknesses that can be used to break the cipher.

A number of vulnerabilities exist to the Public Key Infrastructure. As described, for example, in an article by Carl Ellison (CEO of Counterpane Internet Security, Inc.) and Bruce Schneider (Senior Security Architect for Intel Corporation), "Ten Risks of PKI: What You're Not Being Told About Public Key Infrastructure," a number of intransigent difficulties are associated with PKI.

Many current certification systems for electronic records depend upon a trusted third party, whose identity and public key can be verified by some alternate path and who systems, processes and procedures for issuing certificates must be trusted. Such trust may not, in some cases, be warranted. For example, a Certificate Authority may or may not be a trustworthy organization. Properly evaluating the credentials of an entity who is to issue certificates is difficult. There is also a risk in a CA-based system that the private signing key may not secure. The CA needs to identify an applicant before issuing a certificate, but the checks on the applicant to ensure the right person has been signed up to receive particular data may not be followed. Also, a certification for an individual with a particular name may not be trustworthy if there is more than one individual with the same name. In such a case, public keys and data may be misdirected. Further, it is difficult ensure that all of the computers with a particular transaction (and particularly the verifying computer) are secure.

Certificates and their key pairs last a relatively long period of time. If the certificates and key pairs are compromised, however, certificate revocation lists must be published to anyone who might get and rely upon the third-party's signature. Indeed, severe consequences may result if the certificate authority's key pair is compromised.

Reliable certification becomes even more important as increased reliance is placed upon E-commerce and more purchases are made using the internet. The more funds associated with E-commerce, the greater incentive there is for computer hackers to misdirect funds and the more dire the consequences are if the trusted third party certifying a particular set of data makes a mistake.

Accordingly, less reliance on trusted third parties in order to provide documentary assurance is generally preferred.

There is a growing need for better assurance that a particular document (or set of data) has existed in an unaltered states as of a particular time.

BRIEF SUMMARY OF THE INVENTION

The present system relates to a method for authenticating records. In some applications, it may prove useful for a document to bear a representation of a certification. Accordingly, for a paper document, such certification information may be in graphical form. This graphical form, or design, may be referred to as an "Indicia." The electronic record at issue may be printed out by a computer or stored electronically and bear on it an indicia that relates to the authenticity the document. The indicia (and record) may then be scanned and interpreted by the computer to authenticate the record.

BRIEF DESCRIPTION OF THE DRAWINGS

A preferred embodiment of the present invention is described herein with reference to the drawings wherein:

FIG. 23 is an indica.

DESCRIPTION OF THE SPECIFIC EMBODIMENTS

Overview

Figure 8:
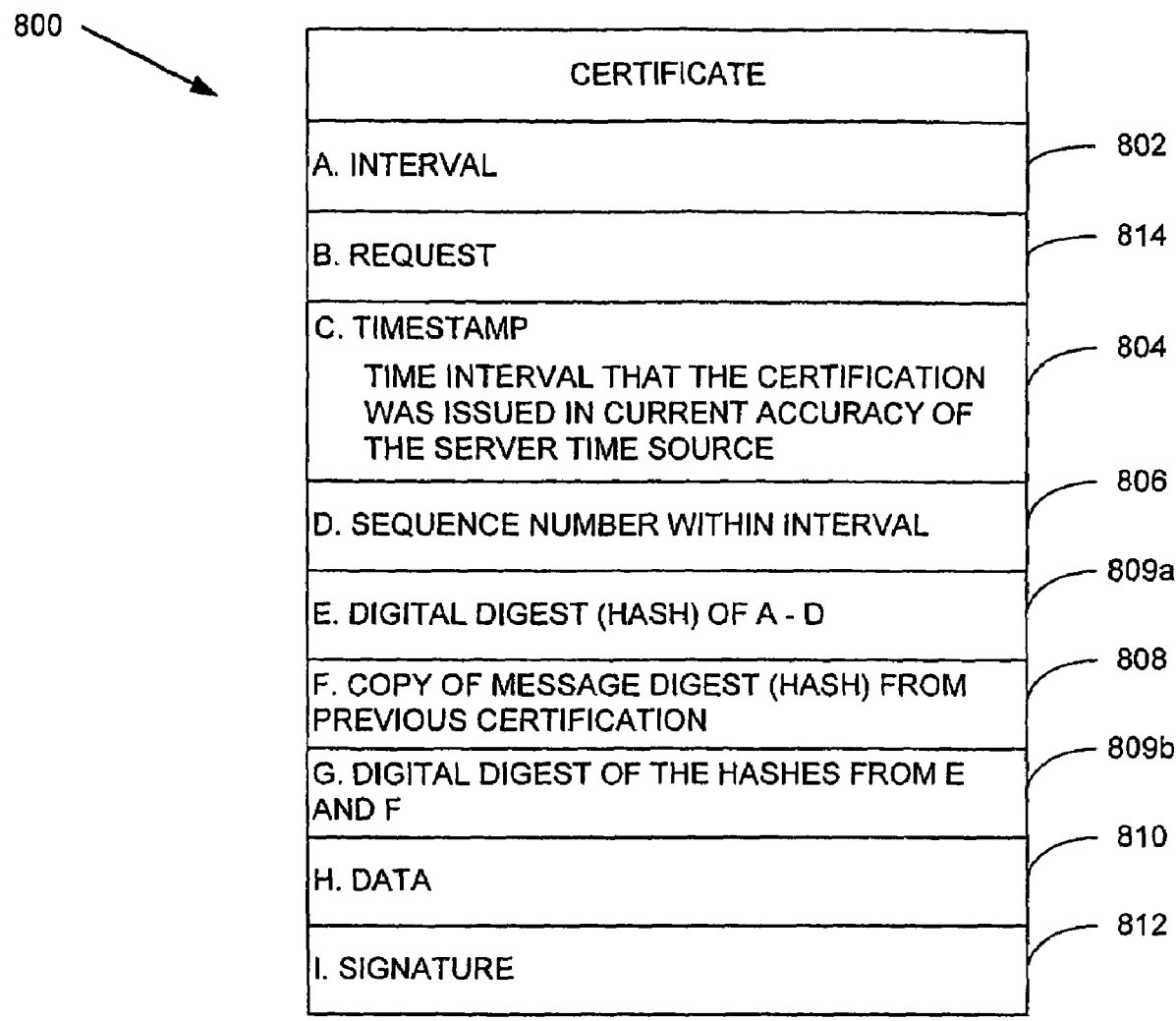
FIG. 8 is a diagram showing the contents of an exemplary certification.

In general, the present method and system provides security with respect to who provided what electronic data at what time, without the need primarily to rely upon the trustworthiness of a single organization or third party. Using the system described in U.S. patent application Ser. No. 09/158,592 a public/private key pair is generally utilized for some relatively short period of time. The private key is used to create digital signature for that period of time and then promptly destroyed. The private key is not stored. The transient key pairs are then chained together serially by a server. A certification or certificate issued by a server according to the present system are sometimes referred to in this document as a ProofMark certificate or certification. Certifications are sometimes referred to in this document as certificates. Exemplary contents of a certificate are represented in FIG. 8.

Figure 9:
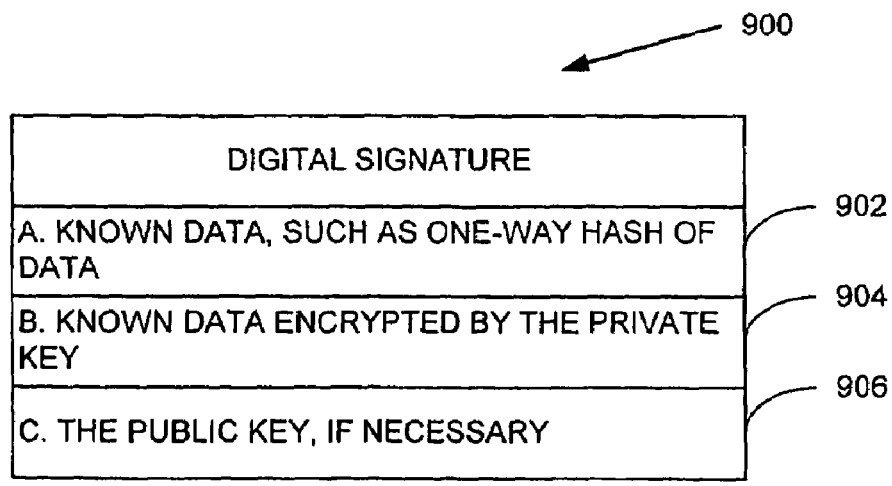
FIG. 9 is a diagram showing the contents of a digital signature.

As shown in FIG. 9, a digital signature is generally the known data (usually a secure one-way hash of the data being signed); the known data encrypted by the private key; and the public key, if not implied. The serially chained certification process is represented by the diagram in FIG. 10.

The Interval certification may include the server's identification; the start time of the Interval chain in UTC, the start time of the Interval in UTC (which, for the first Interval, is the same as the time of the start time of the Interval chain); the stop time of the Interval in UTC; the public key for the Interval; the digital signature for the Interval, signed by the previous Interval's private key; and a digital signature for the Interval, signed by the server's identity key (X.509 PKI or PGP). Upon the expiration of the first Interval, the private key is destroyed. The process is then repeated, as shown, for the second, third and following Intervals. If, for any reason, an Interval can not be created and readied in time, the chain is broken, and a new chain is started.

Figure 11:
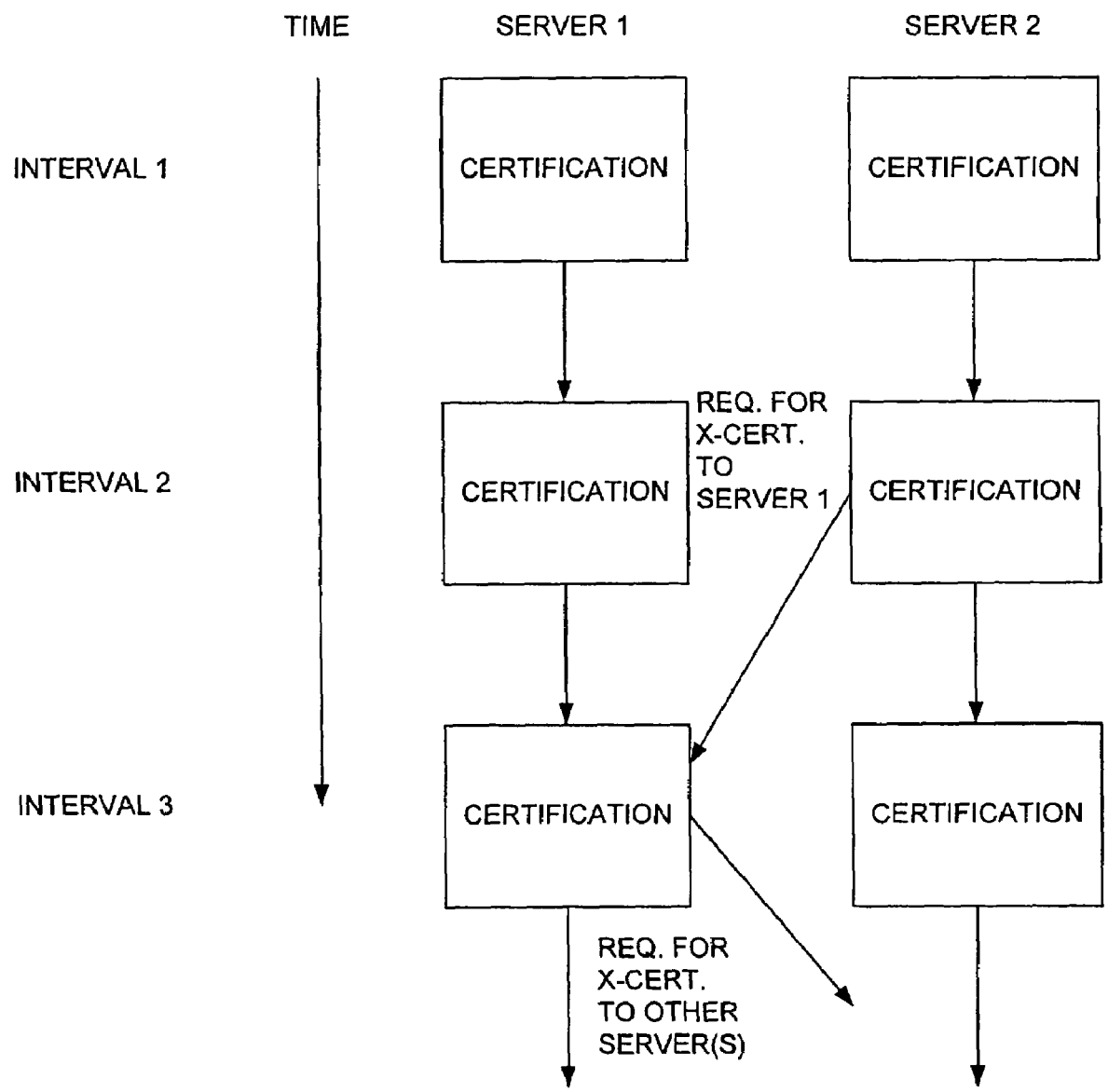
FIG. 11 is a flow chart showing a cross-certification made with the present system.
Figure 13:
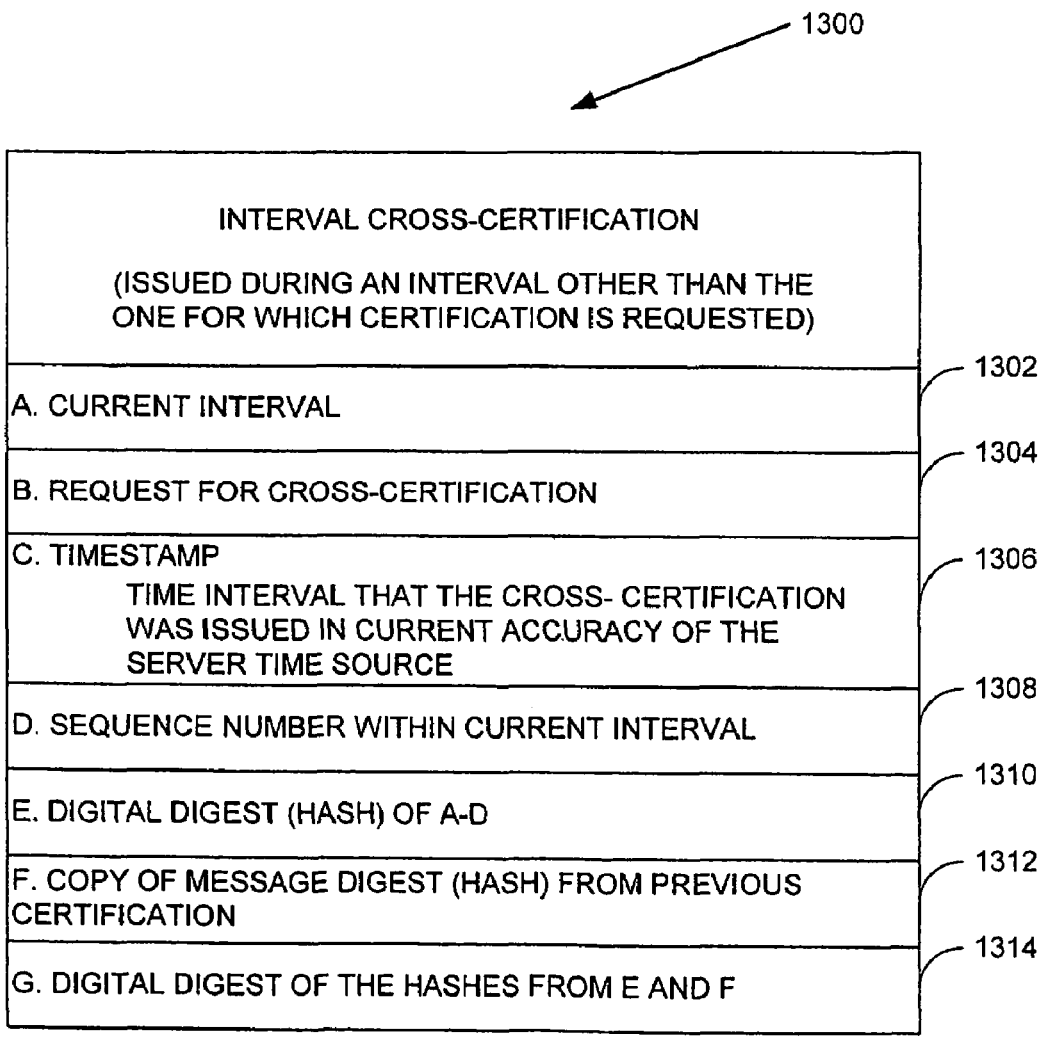
FIG. 13 is a diagram showing the contents of an Interval cross-certification.

With present system, however, intervals are also cross-chained with other servers to form a widely witnessed, temporal web of signed intervals of time, which makes attacks on individual servers fruitless. As shown in FIG. 11, a second server may be configured to request a cross-certification for, e.g., the second Interval. Thus, the first server is effectively requested to provide independent proof of the existence of the Interval (and its public key) at a point in time, which is witnessed by the first server. This cross-certification (e.g., a ProofMark cross-certification) is illustrated in FIG. 13 and is provided in addition to the trusted-time accuracy safeguards implemented by each server.

Figure 12:
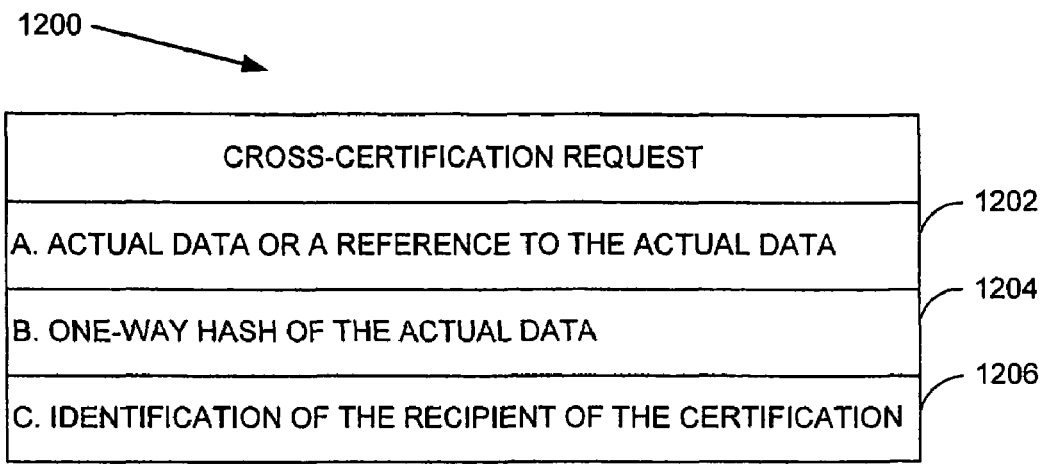
FIG. 12 is a diagram showing the contents of an exemplary cross-certification request.

Of course, the second server could also request cross-certifications from an unlimited number of other servers in addition to the first server. Such cross-certifications can be issued by other servers in the same organization or by servers in other organizations. The contents of a cross-certificate request are shown in FIG. 12.

Since cross-certification certificates are simply certifications that sign an Interval, they are themselves issued by some other Interval. The other Interval of FIG. 11 is, of course, third Interval (since it provides a cross-certification certificate in response to the request issued by Server 2 during the second Interval).

The contents of a cross-certification certificate are shown in FIG. 11. Cross-certification certificates might only issue if selected preconditions are met. Exemplary preconditions are set out, for example, in the diagram of FIG. 14.

Cross-certification certificates form an independent web of trust, or a "chain mail" of proof of the Interval and its keys at an independently trusted point in time. Such cross-certifications protect the archive from forgery, since the cross-certification web often may extend to several archives and replicas of those archives. For example, the ProofMark certificates provide effective security against the possibility of repudiation.

Certification information may be encoded in graphical form. This graphical form, or design, may be referred to as an "Indicia." The record at issue may be printed out by a computer or stored electronically and bear on it an indicia that relates to the authenticity of the document. The indicia (and record) may then be scanned and interpreted by the computer to authenticate the record.

Architecture of the System

Figure 1:
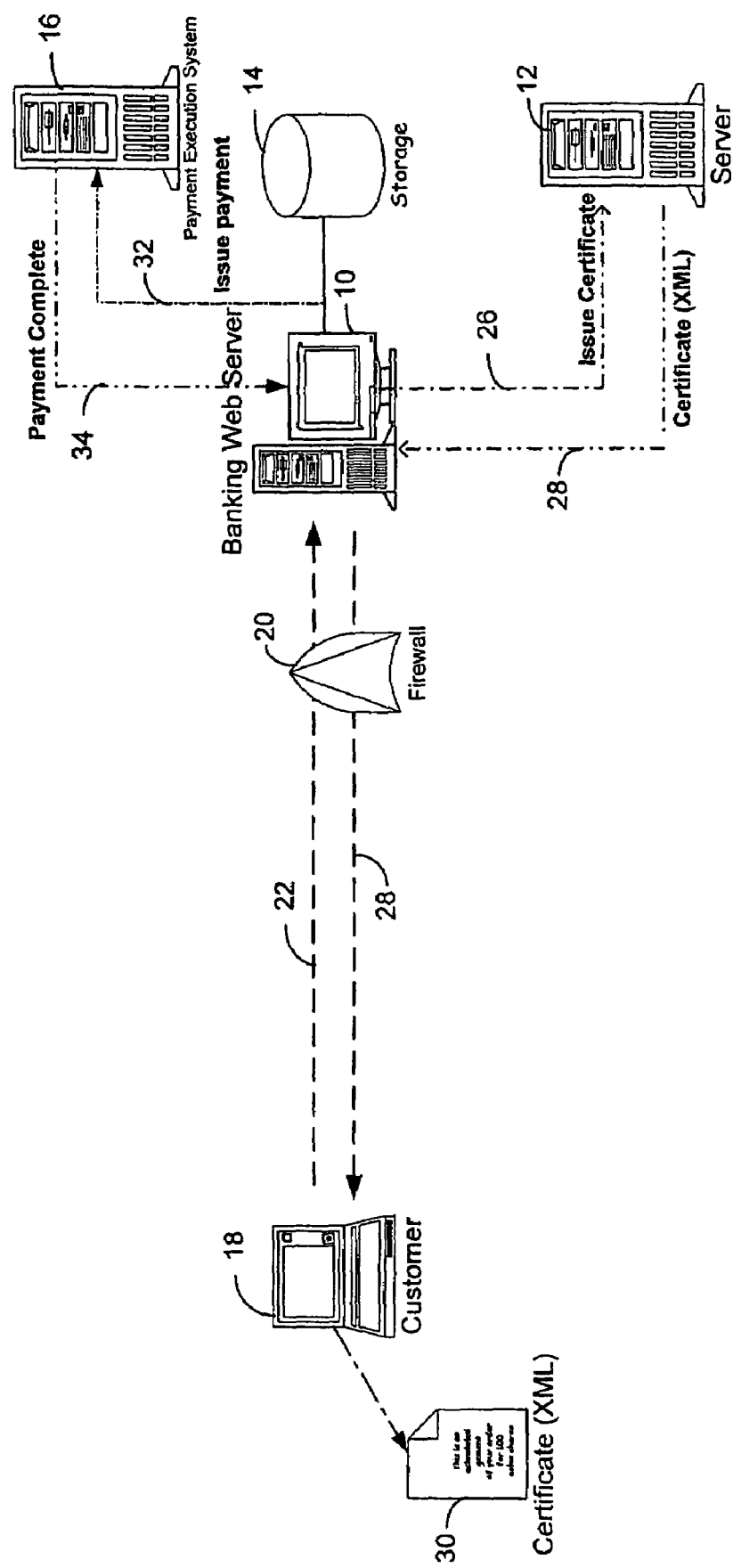
FIG. 1 is a block diagram of a transaction scenario.

Referring now to FIG. 1, one embodiment of the present invention is described. A Client API runs within a Banking Web Server 10 (operated by a bank) and provides communications to a certification and verification server 12, which issues and verifies certificates. The bank stores the certificate in a storage unit 14, which is coupled to the Banking Web Server 10. Optionally, the server 12 can be configured to store the certificate. In this example, the server 12 may be a ProofMark server manufactured by ProofMark, Inc. of Chicago, Ill.

The customer, from a personal computer 18, sends a request 22 to pay a monthly mortgage. The personal computer 18 is coupled through a firewall 20 to the banking server 10. The request goes past the firewall 20 to the Banking server 10. Then, the Banking server 10 issues an electronic payment request to bank's payment execution system 16. Next, the bank's payment execution system 16 issues a payment 32 and an acknowledgement 34. The Banking server 10 requests payment from the execution system 16. Then, the Banking server 10 sends a request 26 for a certificate to the server 12. Next, the server 12 generates an XML file (receipt) 28 and returns it to the banking server 10. Then, the Banking server returns the "receipt" 24 (the same as the receipt 28) to the customer. Finally, the customer stores and prints a receipt 30.

The server 12 creates intervals, issues certificates, and verifies certificates. Other functions are possible. One example of a server is the ProofMark server manufactured by ProofMark, Inc. of Chicago, Ill.

Intervals are created by the system and method of the present invention to provide transient key pairs for encrypting data. Each interval produces one key pair, with a private key that is available only for the duration of the interval, and a public key which is passed on to an archive tree. The archive tree provides the security of multiple servers attesting to the integrity of the system.

In addition to creating the key pair, each interval creates the next interval in an interval chain. This chain of intervals, each signed by the previous interval, is used to provide irrefutable proof for the certificates produced by the system.

Intervals exist for a pre-determined length of time (defined at system configuration). At the end of each interval, the private key is destroyed. The private key has existed only for the duration of the interval, and has never been written to a storage device, increasing the security of the private key.

A certificate can be a Proof Mark certificate, which is an encrypted XML (eXtensible Markup Language) document, created with the interval's private key. Other examples of certificates are possible.

Certificates contain the data to be certified, a time stamp from a trusted time source, and the identity information of the parties involved. A certificate also includes the public key of the interval used to create it and information about where to find an archive that can be used to verify the certificate. Other information may be contained in the certificate.

Certificates are also verified. A verification report is issued by a server in response to receiving a request for verification of a certificate. An example of a verification report is a ProofMark verification report. Other examples of verification reports are possible.

Verifying the data may include confirming that the data in the certificate has not been tampered with (a consistency check), recursively validating of the interval chain used to sign the certificate, or checking a log for record of the creation of the certificate being verified. Other examples of verification are possible.

Figure 2:
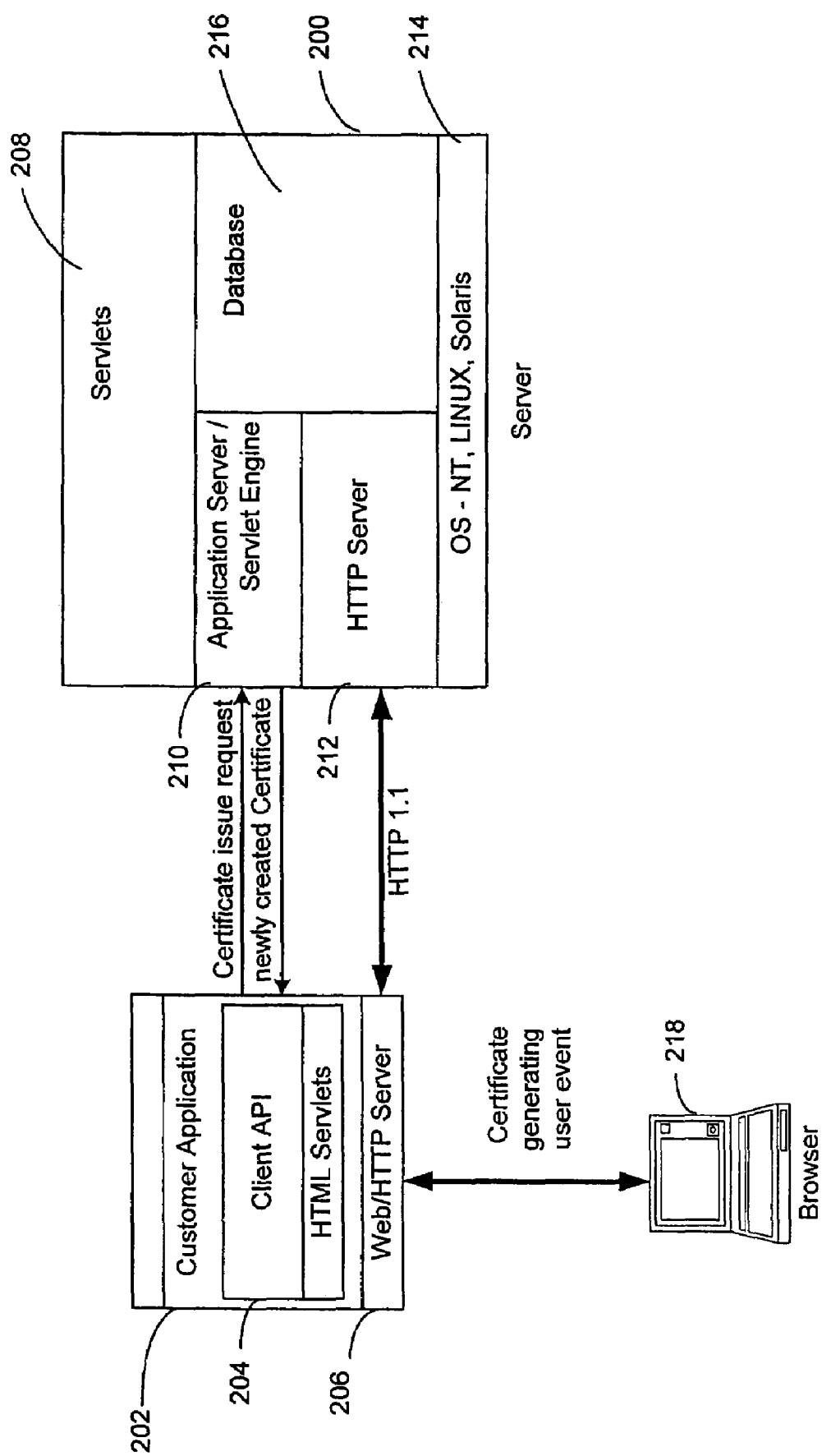
FIG. 2 is a block diagram of the system.

Referring now to FIG. 2, a server 200 is coupled to a customer application 202. The customer application 202 comprises a Client API 204 and a server 206. The Client API 204 may be a ProofMark Client API and the server 200 may be a ProofMark server, both manufactured by ProofMark, Inc. of Chicago, Ill. A browser 218 is coupled to the customer application 202.

The server 200 can be implemented as Java Servlets 208 that can be run on an Application Server. The ProofMark Client API can be implemented as a Java class library and can be run in a Java Virtual Machine. The server 200 also comprises a servlet engine 210, HTTP server 212, operating system 214 and database 216.

A customer requests a certificate using the browser 218. The customer application prepares and issues a certificate issue request. The server 200 issues a certificate in response to the request.

The Client API of the present invention is used to request the issuance or verification of certificates from a server. As stated above, one example of a client interface is the ProofMark Client API. The Client API can be implemented in Java, but implementations in other languages or implementations using other systems are possible.

The Client API constructs and initializes service request objects; converts these objects to XML documents; sends XML/HTTP requests to a designated server; converts server XML/HTTP responses into the appropriate response objects; and presents a consistent set of exceptions, such as communications errors and server errors to the programmer.

The Client API may be optimized to run in a Java2 environment. Other environments are possible.

The Client API typically runs in a corporate environment. The Client API requests or verifies certificates from the corporate systems. The Client API helps to simplify the implementation of the server. The Client API communicates with the server via standard HTTP 1.1.

Figure 3:
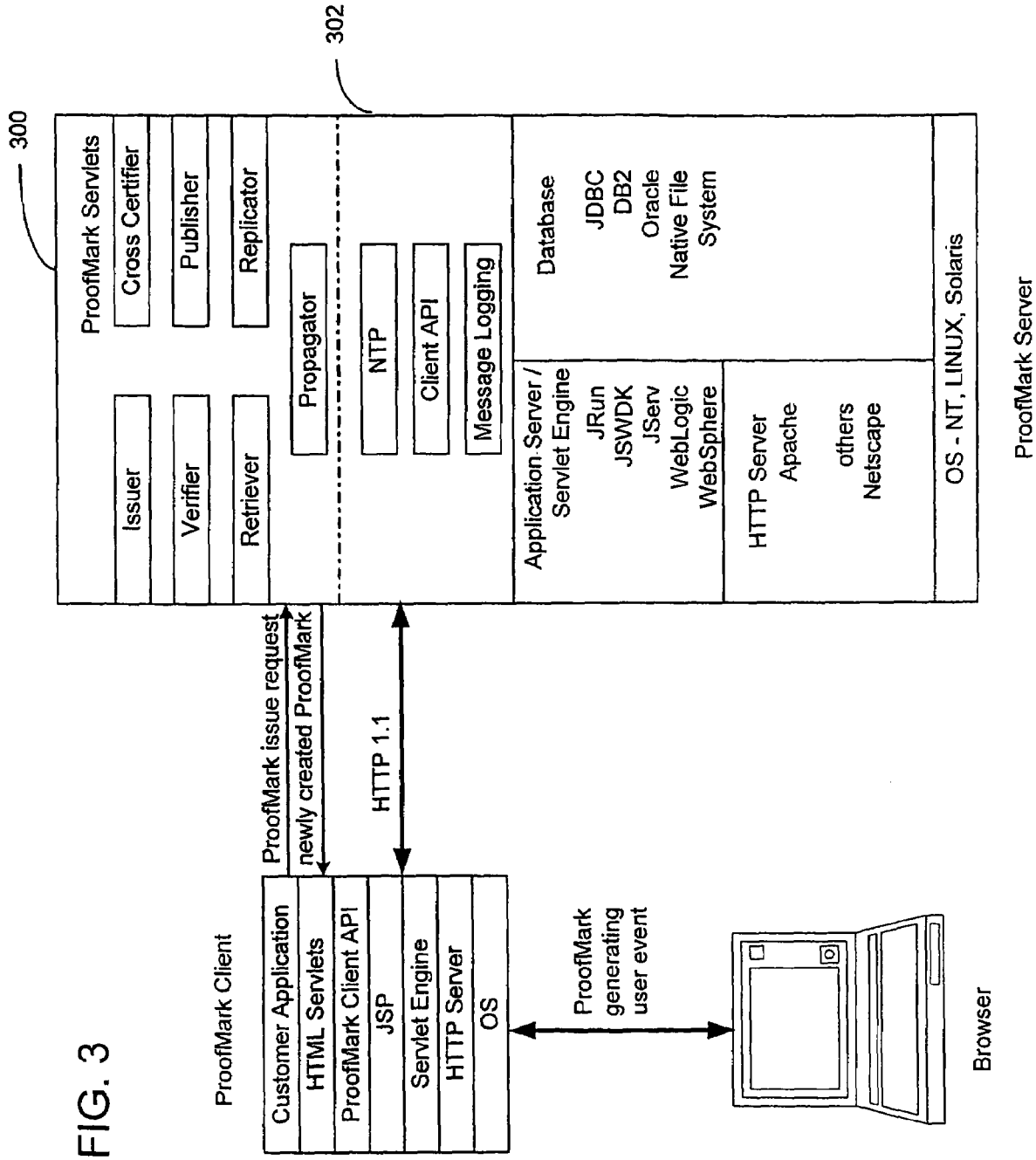
FIG. 3 is a block diagram of the system.

One particular example of the system of FIG. 2 is illustrated in FIG. 3. FIG. 3 also illustrates servlets 302 in server 300.

The following table identifies the primary purpose of these servlets. Other servlets are possible.

| Servlet | Purpose |
| --- | --- |
| Issuer | Responds to requests from the Client API for the issuance of a ProofMark certificate |
| Verifier | Responds to requests from the Client API for verification of a ProofMark certificate |
| Retriever | Responds to requests from the Client API for the retrieval of certificates or intervals |

-continued

| Servlet | Purpose |
| --- | --- |
| Cross Certifier | Issues ProofMark certificates to certify another ProofMark server's Intervals |
| Publisher | Creates and stores new Intervals and certificates |
| Replicator | Sends copies of the archive tree to the appropriate servers |
| Propagator | Forwards intervals to other archives |

The Client API receives requests via HTTP. These requests can be for the issuance of certificates or for the verification of existing certificates.

A request contains some or all of the following information:
- a reference to the data being certified, such as a filename or a SQL string or the actual data to be certified (used when the amount of data to be certified is relatively small and can be included in the request)
- an SHA-1 digest of the contents of the data or the data referred to by the reference (the digest is prepared by a client program when creating the request)
- zero or more X.509 certificates acting as witnesses to the request (to include X.509 certificates, the client application must provide the signed hash of the transaction data to the Client API)

There are additional options that can be used when requesting a certificate, indicating whether the certificate should be stored on the server or whether only a reference to the certificate should be returned.

Figure 10:
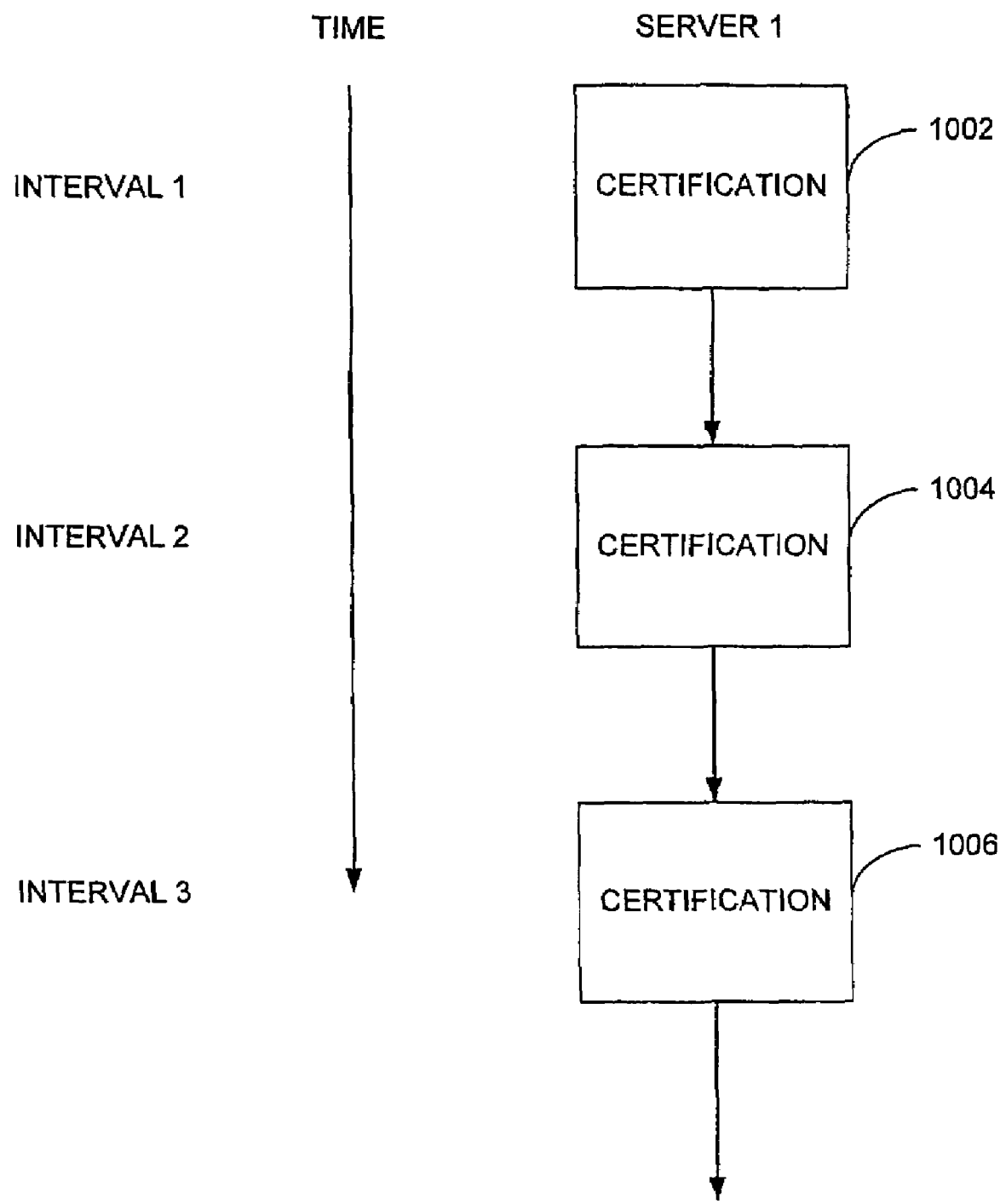
FIG. 10 is a flow chart showing a series of sequential certifications made with the present system.

Certificates are issued for specific intervals. Referring to FIG. 10, certificates 1002, 1004, and 1006 are issued in intervals 1, 2, and 3, respectively.

The Client API also supports verification of previously issued certificates. Verification can be: an internal consistency check (validating the signature within the certificate using the public key); sending the certificate to a server for authentication; recursively verifying the integrity of the interval chain using cross-certifications; and/or recursively verifying the integrity of the interval chain using cross-certifications and checking the digest log for the digest of the certificate being verified.

Each type of verification, except the internal consistency check, produces an XML verification report. If the certificate has been tampered with, the report will indicate what errors were uncovered. Using the more thorough levels of verification impacts the amount of CPU time required to complete the verification.

A multi-processor (MP) machine is preferred, although not essential, to implement the method and system. Cryptographic algorithms perform large numbers of mathematical calculations. An MP machine improves the server's performance, and requires no configuration changes to the server.

A Multiplexing proxy set in front of a group of servers, although not essential to implement the method and system, will increase throughput. When a Multiplexing proxy is used, the client applications point to the proxy, and the proxy redirects the request to actual servers based on current workload.

Another way to increase performance, although not essential to implementing the method and system, is to use a Cryptographic Accelerator card, which is a piece of dedicated hardware that can create key pairs, issue signatures, and verify signatures. For example, nCipher's nFast300 can increase the throughout of an MP machine.

Intervals, certificates, and digest logs may be stored in a variety of memory or database options. For example, they may be stored in any JDBC compliant database or a local file system where information is hierarchically stored in folders. Other storage options are possible. Both options can be used in combination, for instance, a file system for intervals and digest logs, and a relational database for certificates.

The user may choose any of several options for storing certificates. Each option offers different benefits that may apply to particular circumstances. These options include:
- fat certificate, low administrative overhead
- fat certificate, higher client-tier administrative overhead, and smaller indicia
- thin certificate, higher server-tier administrative overhead, and smaller indicia Fat and thin certificates may be implemented as fat and thin ProofMark certificates.

With a fat certificate and low administrative overhead configuration, the corporate requests (through the Client API) that all transaction data be stored within the certificate. The end users are responsible for storing and/or printing the certificates issued to them, which they can use for verification later. With this configuration, less database space is needed since the client tier and the server does not have to store the certificates.

With a fat certificate, higher client-tier administrative overhead, and smaller indicia configuration, the corporate requests (again, through the Client API) that all transaction data be stored in the certificate, but the certificates are stored on the client tier and pass the end user a reference to the certificate. This reference may be similar to a URL, which can be encoded in a very small indicia.

With a thin certificate, higher server-tier administrative overhead, and smaller indicia configuration, the Client API passes transaction data to the server, but only asks for a reference back. A Server tier stores the certificate and the client tier passes a reference to the end user in a very small indicia. This situation is optimal if the server tier is very secure and fault-tolerant, and if end users do not want to store or encode/decode large certificates.

The system may be organized using a variety of topologies. Intra-organizational Cross-certification topologies address server workload and system reliability issues. Inter-organizational topologies provide additional quality of service levels to the certificates that are issued.

The topologies discussed below represent only a few of the possible configurations. Of the intra-organizational topologies, the choice is primarily a matter of volume requirements; the load balancing topology is more appropriate for high volume installations.

Two primary intra-organizational topologies are reciprocal peer and load balancing. Other examples are possible.

The reciprocal peer topology comprises clients connecting directly to one or more servers. The servers cross-certify each other.

Figure 4:
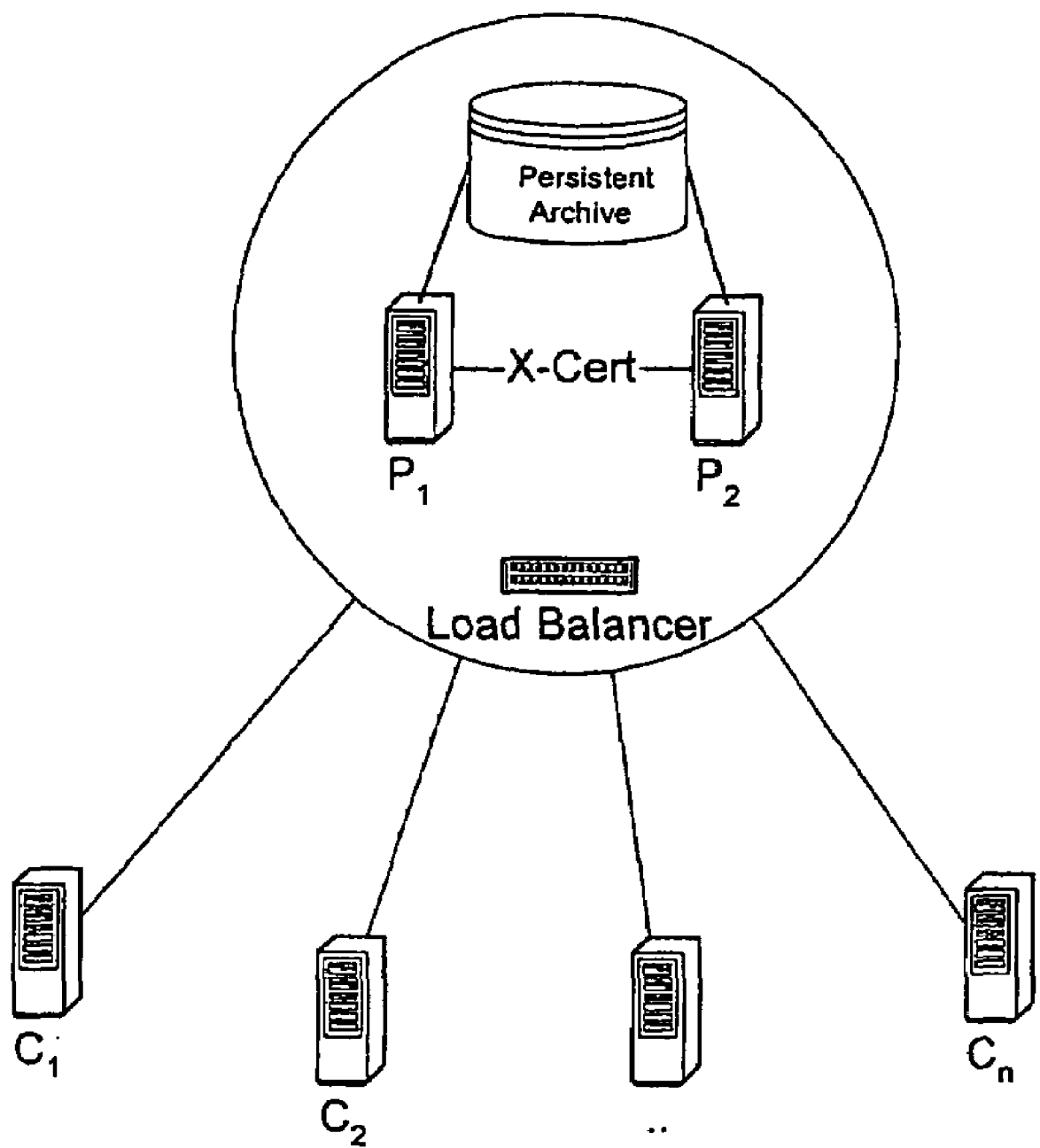
FIG. 4 is a block diagram showing a basic exemplary topology for the present system.

Referring to FIG. 4, all of the organization's clients $C_{1,n}$ connect directly to one of the servers $P_1$ or $P_2$ via a load-balancing server which provides the appearance of a single virtual host. These servers store intervals and cross-certification trees to a shared or replicated archive. The same virtual hostname is used for both issuance and verification, and is therefore used as the archive's nominal hostname.

Figure 5:
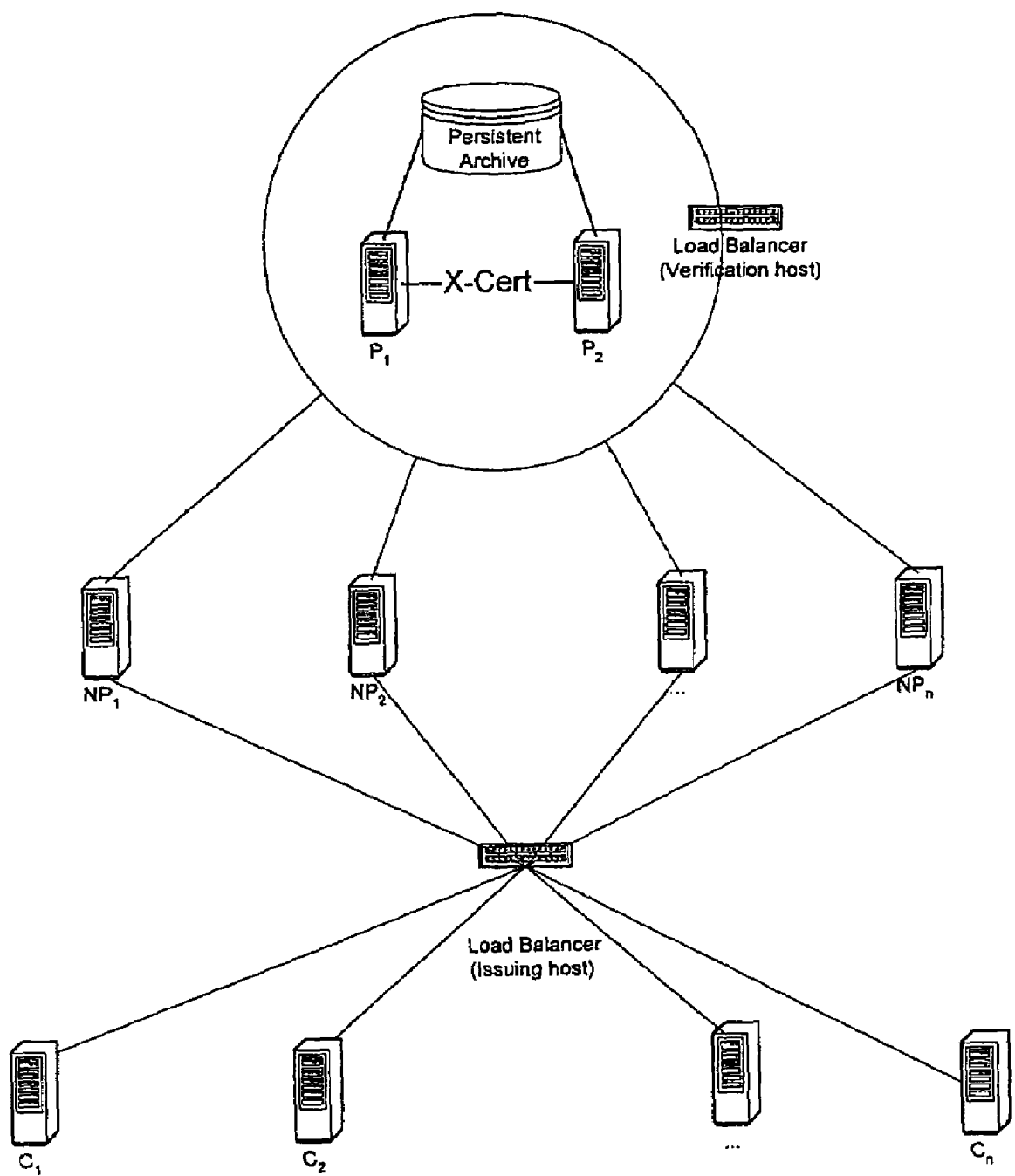
FIG. 5 is a block diagram showing an exemplary load balancing topology for the present system.

In a load balancing topology, which is used in conjunction with a reciprocal peer topology, clients connect to one of several servers $NP_{1,n}$ that do not have local access to the archive. See FIG. 5. These servers in turn cross-certify with at least one of the servers P1 or P2 that only serve as cross-certification and archive servers. A load balancer is not used on the connection between the NPm and P1/P2 servers for purposes of cross-certification, but is present as the nominal archive host and serves to load-balance verification requests to the archive. While not shown, severs distinct from P1 and Pn could be deployed as independent verification/archive servers, so that P1 and P2 would perform only cross-certification requests. Given the light load of simply issuing cross-certifications, one server could easily satisfy this role, but having two provides for redundancy of this function.

Two inter-organizational topologies are meshed peer and hierarchical. Other examples are possible. An organization may be any form of entity or sub-entity within a larger organization.

Figure 6:
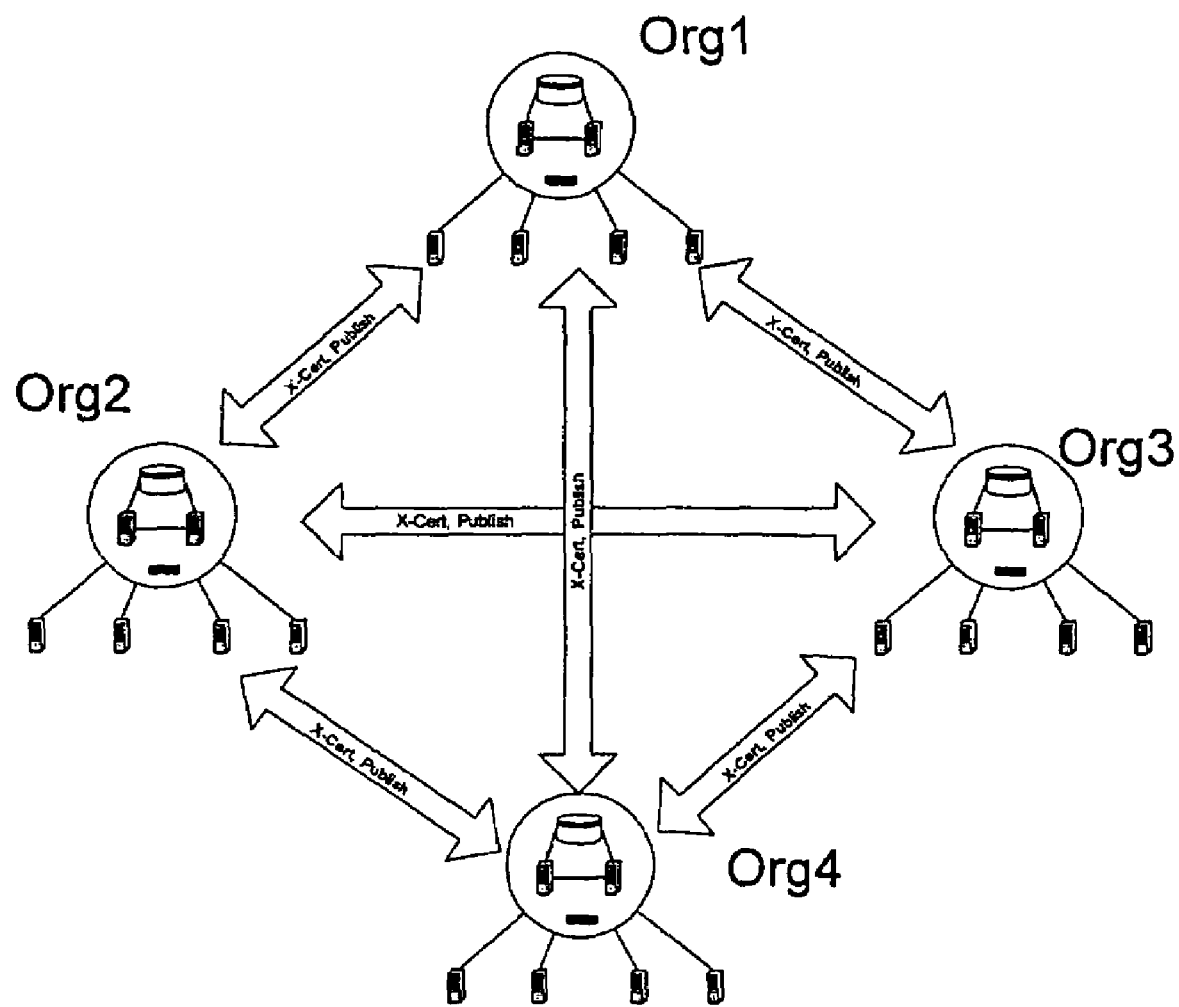
FIG. 6 is a block diagram showing an exemplary inter-organizational topology for the present system.

In a meshed peer topology, several organizations running servers agree to provide mutual cross-certification and publication services. Each participating organization can configure its cross-certifications to be obtained from any number of other organizations, and may specify how many are optional or required for certifying the interval. Certificates issued by one of these intervals will list the root archive as the one belonging to the issuing organization, and will list a tree of other archives where the interval is published. In FIG. 6, the organizations deploy reciprocal peer topologies, but they may also deploy load-balancing topologies. If the load balancing topology is used within an organization, the cross-certification servers will issue cross certifications both within and between organizations. This work is normally insignificant when compared to the load placed on the issuing server farms.

Variations on these topologies include organizations that are present on a meshed peer topology, receiving cross-certification services from one or more of the trusted peers, but providing no cross-certification in return. Additionally, an organization may participate in more than one trusted peer topology.

Figure 7:
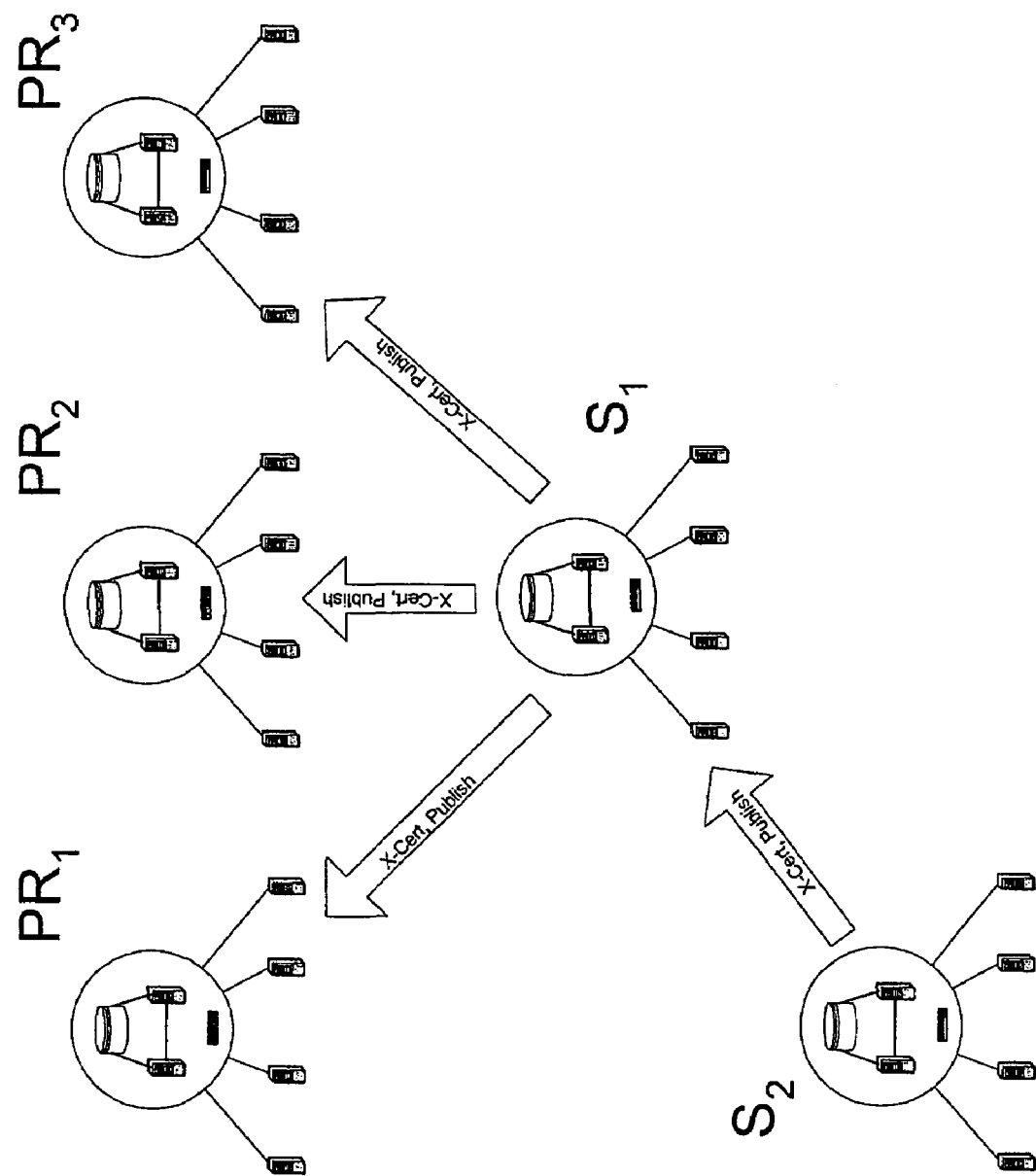
FIG. 7 is a block diagram showing an exemplary hierarchical topology for the present system.

The hierarchical topology closely models the certificate authority (CA) model for digital certificates. In this case, there are recognized and reputable Public Record (PR) service organizations that only supply cross-certification and publication services to organizations. Organizations can request cross-certification directly from a PR, or indirectly through another organization. In FIG. 7, $S_1$ is considered a broker between the public records and organization $S_2$.

Server Operation

Certificates

A certificate is an electronic document that verifies the existence of some data at a point in time that is trustworthy independent of the organization issuing the certificate. It provides non-repudiable proof of the "who, what, and when" of E-commerce transactions and network events.

Certificates are XML (extensible Markup Language) documents that digitally sign and authenticate some data. A certificate is issued by the server in response to receiving an issue request (also an XML document) as input to an HTTP request.

When an issue request is sent to the HTTP server component of a server, the HTTP server recognizes the header as a request for a servlet and dispatches the servlet engine running the server to handle the request. The server encapsulates the certificate Request document inside an XML document and returns this to the client of the request.

Certificates can, as an option, be stored in a database on the server. When that is done, a reference URL used for retrieving the certificate can be returned instead of the full certificate.

One example embodiment of a certificate is illustrated in FIG. 8. Referring to FIG. 8, the certificate 800 contains: the data 810 to be certified; a timestamp 804, in UTC, that the certificate was issued and the current accuracy of the server's time source; an interval 802; a sequence number 806 within the interval; a copy of the message digest (hash) 808 from the previously issued certificate; a message digest 809a and 809b of the contents of the certificate; a digital signature 812 of the concatenation of the two message digests; and a request 814.

Intervals

Intervals are used by the system to provide the transient key pairs which safely encrypt the data in a certificate. Using transient key pairs instead of a long-term secure facility provides greater security for protecting the integrity of the private keys.

The length of time during which a key-pair can be used is set during start-up of an issuing server. Each server generates one key-pair per interval.

A single server has only one active interval at any given time. As the server runs, subsequent intervals are created which are guaranteed to be contiguous (the stop time of an interval is identical to the start time of the next interval). These contiguous intervals form an interval chain, with each interval signed by the previous interval. If a new interval cannot be readied and prepared before its prescribed start time, the chain is broken, and the server automatically restarts a new chain.

An interval contains the following information: the server-id (the hostname[:port] of the server); the start time of the interval chain in UTC (universal coordinated time); the start time of the interval in UTC; the stop time of the interval in UTC; the public key for the interval; the digital signature for the interval, signed by the previous interval's private key; a digital signature for the interval, signed by the server's X.509 (an international standard for the format of digital certificates) identity key; Cross-certification information (a certificate issued for an interval by another server); and the digest log of the interval completed just prior to the interval used to create the current interval.

Referring to FIG. 9, a digital signature 900 comprises known data 902. This can be in the form of a secure one-way hash of the data being signed. In addition, the digital signature comprises the known data encrypted 904 (encrypted by the private key) and a public key 906.

Interval length, in seconds, is the amount of time that an interval and its unique keypair will be used before destroying the private key and creating a new Interval. There are several considerations in selecting this length. For instance, shorter intervals may provide a smaller target for hackers. Also, intervals are independently cross-certified which may make a shorter interval advantageous. In addition, the creation of the next interval (since each interval is prepared during the previous interval) may make a longer interval is advantageous. The storage of intervals in the archive may make longer intervals better since longer intervals may result in fewer Intervals to store.

In weighing these considerations, the inventors have discovered that an interval length of around 5 minutes is advantageous in some situations. However, depending upon the type of installation, and other factors, any length of interval may be used.

A shorter interval may be preferable since it is a smaller target for hackers. If the other safeguards in protecting the transient private key were broken, obtaining any given private key would only allow for false issuance of certificates for the one Interval. This risk is much lower since keys are never stored or transported, and only exist during the interval. Using a supported hardware crypto-accelerator, they never exist or are accessible outside of the transient memory in the crypto-processor board. This is a significant improvement over permanent key, third party key systems.

A shorter interval may also be preferable since each interval is independently cross-certified. A smaller Interval may tend to strengthen the independently-verifiable time of the certificates issued by the interval, to the extent that the atomic-clock time sources used by any one server are suspect.

On the other hand, a longer interval may be preferable since the interval is prepared for use during the previous interval. This preparation includes key generation, obtaining cross-certifications for the interval, storing the interval in the local archive, and publishing the interval to at least one external archive, if any are specified.

All of these must be completed before the start time of the interval, and extra time may be required if there are temporary network bottlenecks in obtaining, for example, cross-certifications for the interval. Selecting too short an interval may impact server availability if these things cannot be completed on time.

A longer interval may also be preferable since there will be fewer intervals to store in the archive, retrieve, and cross-certify. This results in less network overhead and less file storage in the archives where the interval is stored.

Interval Chains

The first two intervals in the chain act as bootstrap intervals for signing the chain, and are generally shorter than the configured interval length. These intervals exist only until they can create the subsequent intervals, and are never used to issue certificates.

The start time of the very first interval in the chain is known as the chain start time, and is stored in each interval. While theoretically possible, it is unlikely that two different servers would be configured with the same server-id. It is highly improbable that these servers could also be started at exactly the same time, resulting in identical chain start-times. Therefore, adding the chain start time to the server-id uniquely identifies an interval chain. Once the chain is identified, an interval within the chain is uniquely identified by the interval's start time. The chain's intervals are stored persistently in an archive.

During each interval, the private key is used in the creation of certificates. Many certificates can be issued during an interval, each signed by the interval's private key.

At the end of each interval the private key is destroyed and a new key pair is generated for the subsequent interval. During the process of activating a new interval, the current interval's private key signs the new interval's public key and start and stop times. Once a signature for the interval's key has been acquired, the private key is permanently destroyed.

The start time within each interval coupled with the chain start time form an unbroken sequence of public keys that can be used to fix a certificate's position in time, which also fixes the exact state of a set of data at that point in time. To prove this state at some future point, the chain of public keys is posted to an easily accessible place (i.e. several web servers) from where they can be used to verify a certificate.

Interval Cross-Certification

Cross-certifications are certificates whose signed data is an interval, and cross-certification refers to the process by which one server issues a certificate for another server's interval. The cross-certification provides independent proof of the existence of the interval (and its public key) at a point in time, and creates a widely witnessed chain of proof for the interval. Cross-certifications also protect the archive from tampering, since the cross-certification web extends to several archives and replicas of those archives.

An interval can have any number of cross-certifications, issued either by other servers within the same organization, or by servers in other organizations. A minimum number of cross-certifications must be returned before the interval can become active (set at system configuration). A larger number of cross-certifications results in a more widely witnessed chain of proof.

The cross-certification process requires that the timestamp (from a trusted time source) of the interval and the timestamp of the cross-certifying server agree. That means the difference is less than the sum of the accuracies of the two timestamps plus the time required to obtain the cross-certification.

During cross-certification, the cross-certifying server authenticates the PKI signature in the interval that is being cross-certified, and rejects any requests whose PKI signatures cannot be verified.

Referring to FIG. 11, one cross-certification process is described. As shown in FIG. 11, a second server may be configured request a cross-certification for, e.g., the second interval. Thus, the first server is effectively requested to provide independent proof of the existence of the Interval (and its public key) at a point in time, which is witnessed by the first server. This cross-certification (also referred to in this document as a ProofMark cross-certification and illustrated in FIG. 13) is provided in addition to the trusted-time accuracy safeguards implemented by each server.

Of course, the second server could also request cross-certifications from an unlimited number of other servers in addition to the first server. Such cross-certifications can be issued by other servers in the same organization or by servers in other organizations. The contents of a cross-certificate request are shown in FIG. 12.

Since cross-certifications are simply certifications that sign an Interval, they are themselves issued by some other Interval. The other Interval of FIG. 11 is, of course, third interval (since it provides a cross-certification in response to the request issued by Server 2 during the second interval).

The contents of a cross-certification certificate are shown in FIG. 11. Cross-certifications may only issue if selected preconditions are met. Exemplary preconditions are set out, for example, in the diagram of FIG. 14.

Cross-certifications form an independent web of trust, or a "chain mail" of proof of the Interval and its keys at an independently trusted point in time. Such cross-certifications protect the archive from tampering, since the cross-certification web often may extend to several archives and replicas of those archives. The certificates provide effective security against the possibility of repudiation.

Referring to FIG. 12, a cross-certification request 1200 comprises actual data or reference to actual data 1202, one-way hash of actual data 1204, and identification of the recipient of the certification 1206.

Referring to FIG. 13, a cross-certification certificate 1300 comprises a current interval 1302, request for cross-certification 1304, time stamp 1306, sequence number 1308, digital digests 1310 and 1314, and a copy of the message digest from the previous certification 1316.

Figure 14:
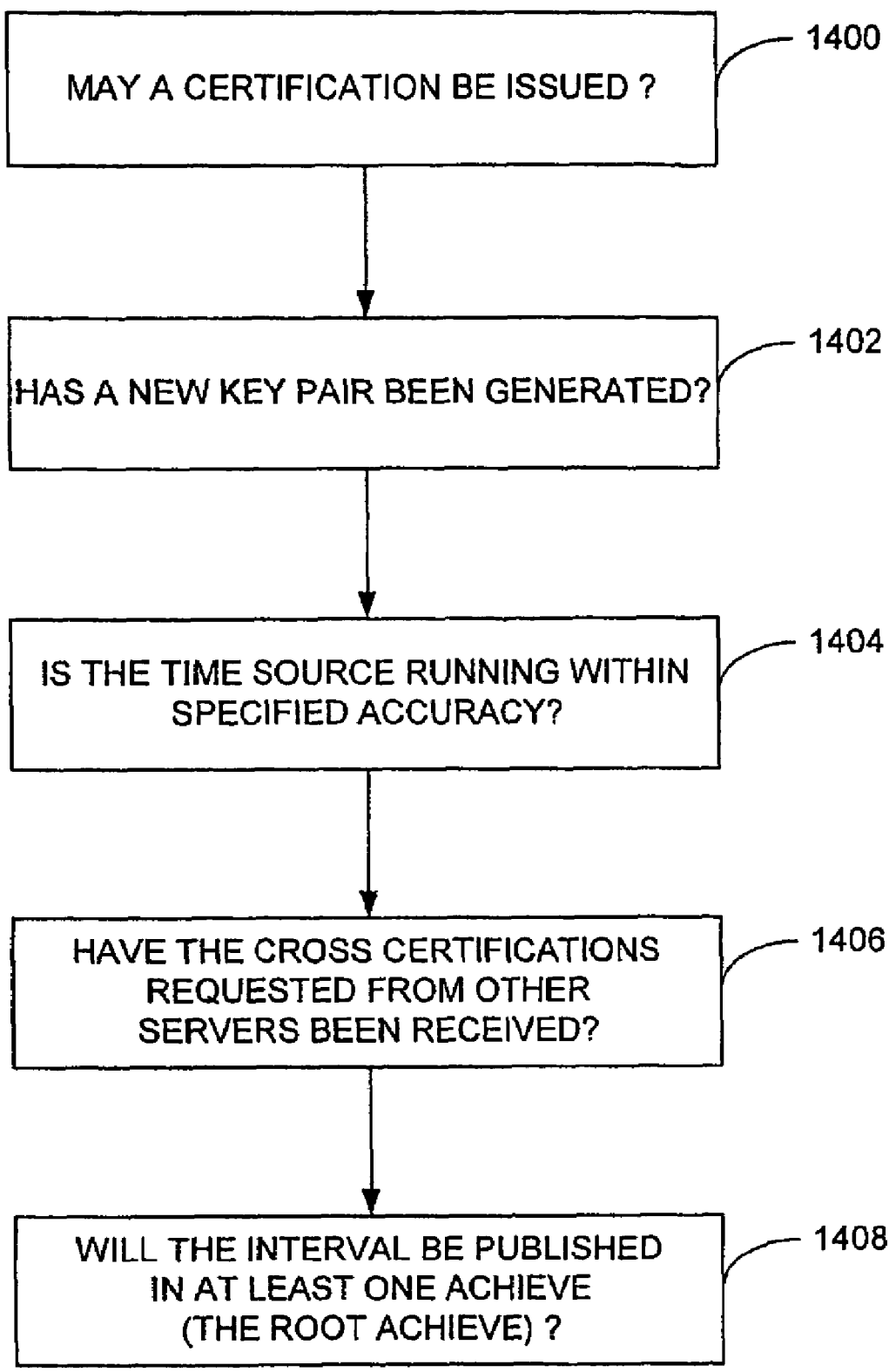
FIG. 14 is a flow chart showing a series of inquiries made in the present system prior to issuing a certification.

Referring to FIG. 14, preconditions for certification are described. Step 1400 checks to see if a certification has been issued. Step 1402 checks whether a new key pair has been generated. Step 1404 determines if the time source is running with the specified accuracy. Step 1406 checks if cross-certifications have been received from other servers. Step 1408 checks if the interval will be published in at least one archive. If any of the answers to the above steps are negative, certification may not proceed. Or, only some of the conditions may need to be met in order for certification to proceed. Alternatively, certification might proceed if none of the conditions are met.

Figure 21:
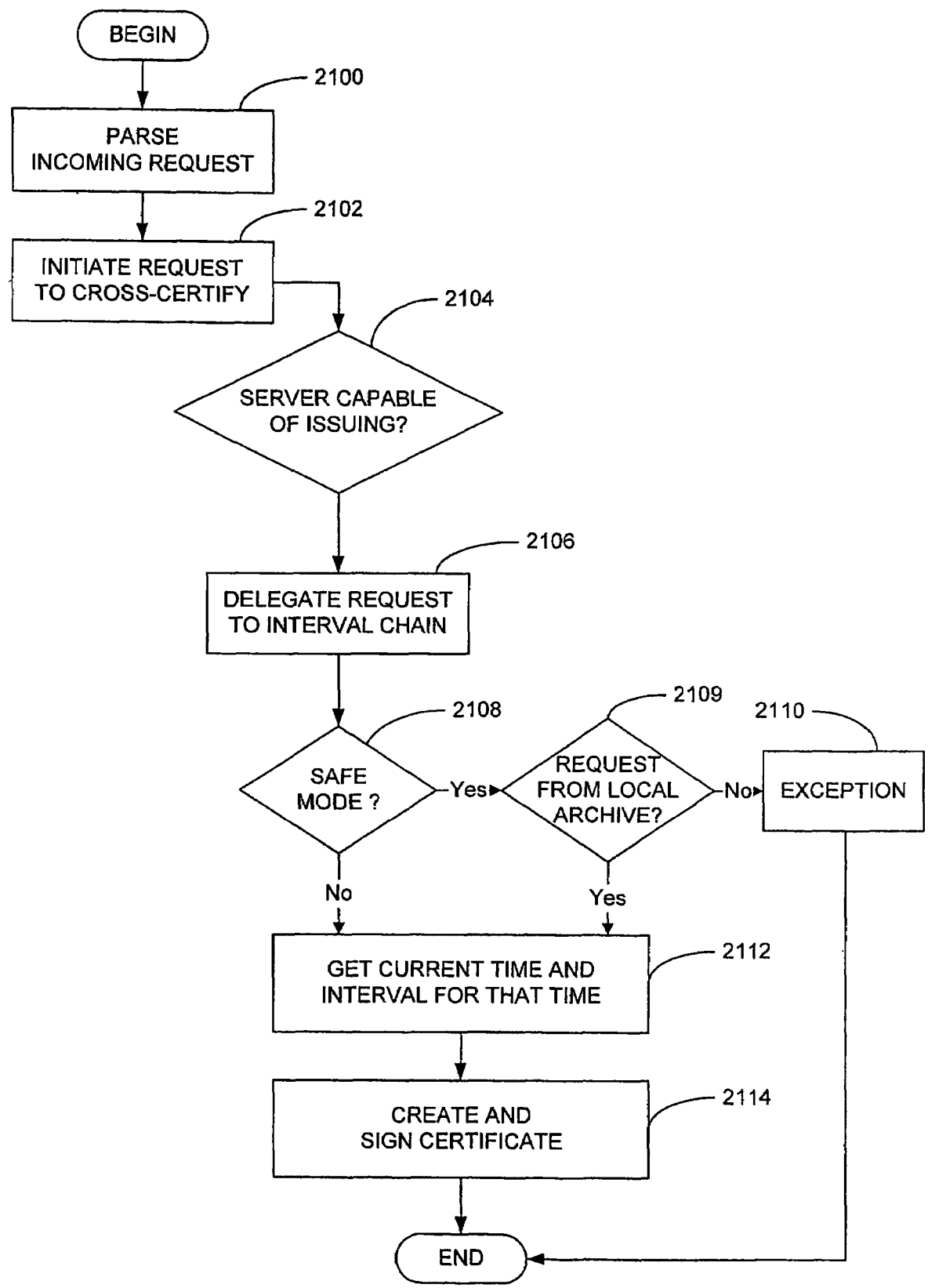
FIG. 21 is a flow chart showing cross-certification.

Referring now to FIG. 21, an illustrative cross-certification process is described. A servlet parses the incoming request at step 2100. Then, at step 2102, the servlet initiates a request to perform cross-certification. At step 2104, a test is performed to determine whether the server is capable of issuing a cross-certification certificate. For example, if a server is being used, it is determined whether the server is configured to issue certificates.

Then, at step 2106, the request is delegated to the interval chain. In other words, the request is passed to the interval chain. At step 2108, it is determined whether the server is in safe mode. If the answer is affirmative, execution continues at step 2112. If the answer is negative, it is determined whether the request is to cross-certify a certificate from a local archive at step 2109. If the answer is negative, then, at step 2110, an exception is logged and execution ends. If the answer at step 2109 is affirmative, then control continues at step 2112. At step 2112, the current time and interval are obtained. Next, at step 2114, a certificate is created and signed.

Trusted Time

Each certificate has a timestamp indicating the time that the certificate was issued. The timestamp is created using Universal Coordinated Time (UTC), with precision to the nearest millisecond. Within the server, timestamps are obtained from a trusted time source (commonly via the Network Timing Protocol (NTP)).

Times are calculated via a time biasing mechanism, which obtains the time from the trusted time source periodically and uses a local hardware timer in the interim. If the trusted time cannot be obtained, the server will not issue certificates until the trusted time can be reestablished. The system clock, which is vulnerable to tampering, is never used as a source of time.

Every timestamp has an associated accuracy, in milliseconds, which is reported along with the timestamp in every issued certificate. In a typical configuration, accuracy within 100 milliseconds of the Atomic clock is possible.

If the TimeSource is not running within its specified tolerance, a StaleTimeException occurs, which prevents the creation of certificates.

Digest Logs

The digest log is used to ensure that false certificates cannot be created after an interval has been created, cross-certified, and published (unless the attacker has successfully compromised the entire distributed network of cross-certifying servers and archives).

The digest log contains the individual digests for each certificate created by an interval, as well as a "superhash" digest, computed from the individual digests. The digest log is placed into the next interval to be created within the interval chain (this is not the interval immediately after the interval the digest log represents, but the one following it).

When the interval is published, the digest log is also published. Digest logs are periodically propagated to the same archive(s) as the intervals they represent.

The digest log is used to protect against the creation of false certificates. While it is possible for someone to obtain the transient key for an interval (which can be done only while the interval is active), the digest log would not contain a digest for any false certificates created using the private key.

The existence of the digest log also enhances security. A cracking attack is one in which the transient private key is deduced after the end of an interval, by applying cryptanalysis techniques to existing certificates created during the interval. A false certificate created using a private key obtained in this manner could not be verified if the digest log verification option was required, since no record of that certificate would be present in the digest log for the issuing interval. Finally, since digest logs are cross-certified in the same manner as intervals, tampering with a published digest log after the fact would require altering all records of the digest log, in all cross-certifying servers.

The risk of false certificates is much lower with the present invention since keys are never stored or transported, and only exist during the interval. Using a supported hardware crypto-accelerator, they never exist or are accessible outside of the transient memory in the crypto-processor board. This is a significant improvement over permanent key, third party key systems.

Ensuring Server and Interval Identity

Preferably, a server is uniquely identified by an Internet hostname and optional port number, for example, 80. The server ID is included in the interval.

Preferably, the server can interoperate with the Public Key Infrastructure (PKI) digital certificates issued by a Certificate Authority (CA), such as Verisign, Entrust, or a customer-operated CA.

Each server can have an optional digital certificate with a Subject distinguished name (SubjectDN) that matches the server's hostname (the servernD, excluding the optional port). Each server that has such a certificate can be configured with information on how to locate and use the certificate during startup. A server that has been so configured will use the certificate's key to create a digital signature of each interval that it creates. The digital certificate's key and signatures are distinct and independent from the interval's transient key pair. The PKI information will appear as a PKISignature element in the interval within each certificate issued by the server.

Verification

Once a certificate is issued, a user may request a determination that it has not been tampered with and that it is authentic. To determine that a certificate has not been tampered with since it was issued, an internal consistency check can be performed. To determine that a certificate is authentic, it is sent to an archive for verification.

To confirm a certificate's authenticity, it must be verified against an archive. There are several types of archive verification. All types of archive verification perform the internal verification described above prior to checking the archive.

Several types of interval verification are possible including internal verification, interval verification, cross-certification verification, and digest log verification. The later three represent types of archive verification.

Internal Verification

With the aid of publicly available software, any certificate can be tested for internal consistency. This check does not require communication with a server, yet will immediately detect if the certificate was modified since it was issued.

To test a certificate for internal consistency, the system compares a digest of the original data (created with an SHA-1 hash algorithm) with the digest from the certificate. If the two digests match, the certificate is internally consistent. If the two digests do not match, the data in the certificate has been tampered with, and it is not a valid certificate.

The first level of archive verification authenticates any PKI signatures which were included in the original request that generated the certificate (these are part of the certificate). Authentication is accomplished by first verifying each certificate in the PKI signature's certificate chain, then checking for a trusted certificate in the machine's local keystore whose subjectDN matches the issuerDN of the first certificate in the PKI signature's certificate chain. If these keys fail to match, an error is reported in the verification report.

Cross-Certification Verification

The second level of archive verification authenticates the PKI signatures, and checks the archive for the public key of the interval. Then, the interval's cross-certifications (which are themselves certificates) existing in the archive are recursively authenticated.

Figure 22:
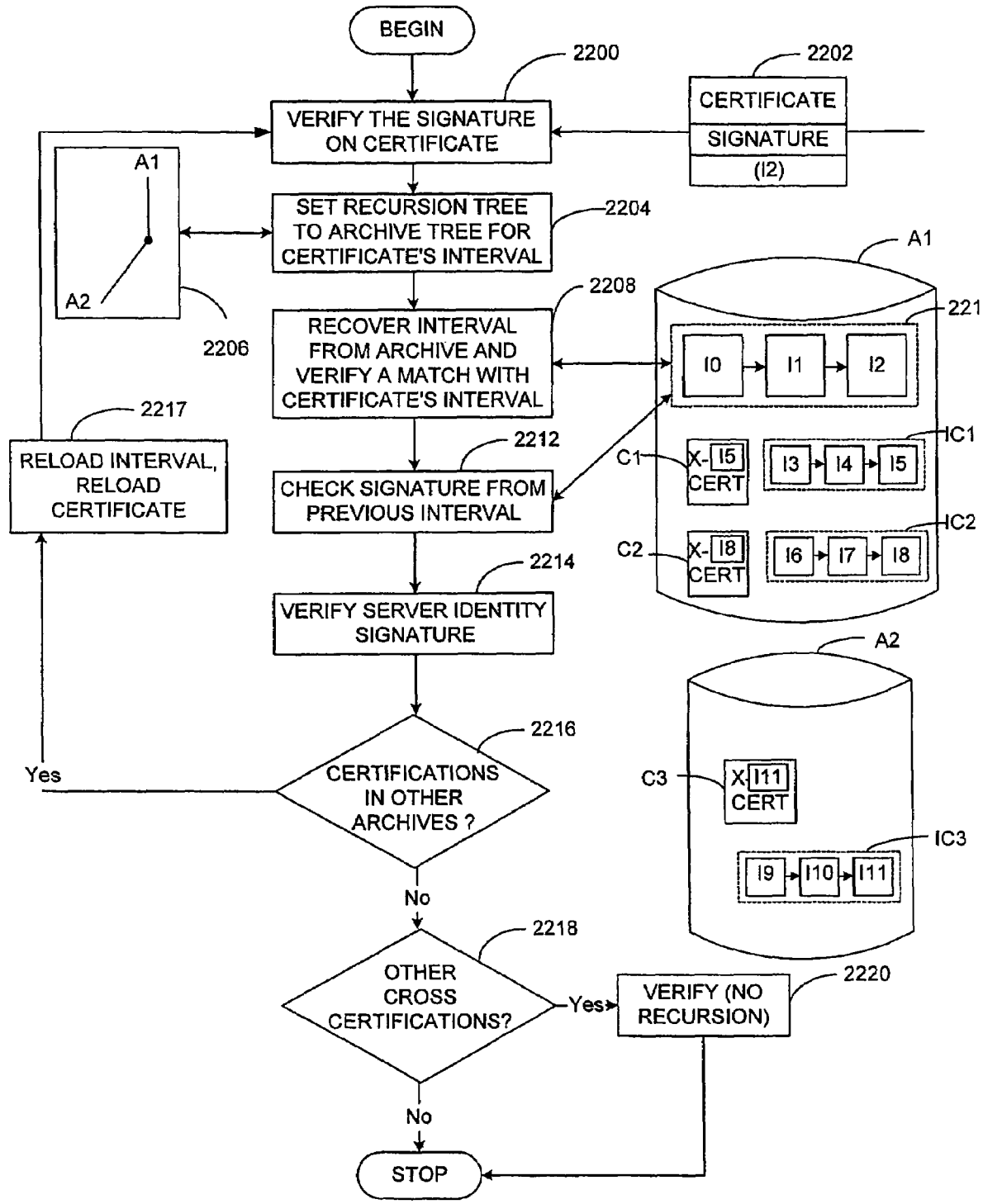
FIG. 22 is a flow chart showing verification.

Referring now to FIG. 22, one verification procedure of the present invention is described. Cross-certification certificates C1 and C2 reside in archive A1. Cross-certification certificate C3 resides in an archive A2. Cross-certification certificate C1 has an associated interval chain IC1; C2 has an associated interval chain IC2; and C3 has an associated interval chain IC3. The certificate 2202 has an associated interval chain 2210. The interval chain 2210 has intervals I0, I1, and I2; C1 has intervals I3, I4, and I5; C2 has intervals I6, I7, and I8; and has intervals I9, I10, and I11. The numbering of the intervals between chains (i.e., I0 . . . I2, I3 . . . I5, I6 . . . I8, and I9 . . . I11) is done for ease of explanation. Sequencing between chains, although possible, is not required (i.e., I3 may not follow I2 in time).

The certificate 2202 is the "current certificate" being verified and may change, as described below. The interval in the certificate is the "current interval," in this case, I2. The current archive is the archive where this interval is stored, in this case, A1.

At step, 2200, the signature on a certificate 2200 is verified. At step 2204, the recursion tree is set to an archive tree 2206 for the current certificate's interval. In this case, it is set to archive tree for I2, which is archive tree 2206. At step 2208, the interval chain 2210 is recovered from the interval's archive. In this case, interval chain 2210 is recovered from the archive A1. Then, the interval is recovered and a match is attempted to be made with the current interval. In this case, I2 is recovered from chain 2210 and matched against the interval (I2) from certificate 2202.

Next, at step 2212 the signature from the previous interval is checked. In this case, the signature of I2 (that was created with the private key of I1) is decrypted with the public key of I1. Then, at step 2214, the server identity signature is verified. The server has a certificate and I2 is verified as to whether I2 was signed by this certificate.

At step 2216 it is determined if there are more certifications in other archives. If the answer is affirmative, at step 2217, the certificate and its interval are reloaded. For instance, C3 replaces certificate 2202 and IC3 replaces chain 2210. Then, the process is repeated. For example, I11 (C3's interval) is checked against I11 in the chain IC3. Also, the signature of I11 (that was created with the private key of I10) is decrypted with the public key of I10. The server identity signature is verified.

Preferably, this process is repeated at one-level. That is the system may verify the certificates in the archives certifying certificate 2202, not the cross-certification certificates for these cross-certification certificates. However, multiple levels of recursion are possible.

If the answer at step 2216 is negative, at step 2218, it is determined if there are more cross-certifications in the interval's archive (In this case, archive A1). If the answer is affirmative, then, at step 2220, the other cross-certifications are non-recursively checked. In this case, C1 and C2 are checked against the interval chains IC1 and IC2. Further, I5 (C1's interval) is checked against I5 in the chain IC1; I8 (C2's interval) is checked against I8 in the chain IC2. Also, the signatures of I5 and I8 (that were created with the private keys of I4 and I7, respectively) are decrypted with the public key of I4 and I7, respectively. The server identity signatures are also verified. If the answer is negative, execution ends.

Digest Log Verification

The highest level of archive verification authenticates the PKI signatures, checks the archive for the public key of the interval, and checks the interval's cross-certifications. When these have been verified, the server confirms that the digest exists in the interval's archived digest log.

Verification Reports

The server issues a verification report in response to a verification request. Input to this request is the certification (the XML) to be verified. Output from this request is a verification report XML document containing the results.

The verification report either lists any errors discovered in the process or indicates that the verification was successful.

Archives

An archive is a logical or named database in which intervals and their cross-certifications are stored. The ability to retrieve an interval and its cross-certifications from an archive provides all the information necessary to complete the verification of a certificate.

Because an archive is a logical database, it can be shared or replicated (copied) to many servers, and can be hosted on any server. Its physical persistence may be mapped into either a normal file system or a JDBC-compliant (Java Database Connectivity) relational database.

Each archive is identified by a unique hostname URL: hostname or hostname:port. For example, the port may default to 80. This host name is the logical host of the archive, which may be either a single real server or a load-balance proxy to a group of servers. Other hosts may have replicas of the archive as well.

If the archive's real host ceases to exist, the archive directory will list forwarding host addresses where copies of the archive are located.

Archive Directory

A Web server exists that contains a database of forwarding addresses for archives whose contents are no longer serviced by the original logical host. The normal verification of a certificate would send a request to one of the archive hosts listed in the certificate's archive tree. If one or more of these hosts were no longer operating, the directory could be queried for other servers that now serve the archive.

Replication

Since several servers may have a copy of an archive, or contribute to it, the copies of the archive are replicated among each server in the archive. This replication may be achieved by several methods. For file-system archives, any file replication product, such as the Andrew File System (AFS), or utilities such as RDIST (remote software distribution system) or RSYNC (a file transfer program for Unix systems) can be used. For JDBC database archives, either a shared database service or the replication service can be used.

Interval Archive Tree

Every interval must be stored in at least one archive, known as the interval's root archive. Intervals may be stored in additional archives as well. During creation of the interval, an archive tree is established for the interval and the interval is stored or published in its root archive before it is available for use.

After its initial publication, the interval is forwarded asynchronously to one or more additional archives in the archive tree, which may in turn each forward to additional archives. The archive tree is represented as part of the interval's XML representation and therefore appears in each certificate issued by the interval. This enables the holder of the certificate to know which archives can be used for later verification of the certificate. In one example, a client may have its own archive, and will forward its intervals to a public archive, but more extensive archive trees are possible. Each additional archive may have been configured to forward to another level of archive (propagating the archives).

The process of establishing the archive tree for an interval occurs immediately after the cross-certifications for the interval have been obtained. The archive tree is constructed by combining the archive trees from the servers that issued cross-certifications as follows. The interval's local archive becomes the root of the archive tree. The set of archive trees of all of the cross-certifications for the interval are added as immediate branches of the root archive. If there are archives that have been configured for publication, without requiring cross-certifications, these archives are also added as branches. Any cycles or redundant branches in the resulting archive tree are removed.

Alternatively, the interval does not have a local archive. In this case, it must be configured with only a single cross-certification group from which cross-certifications are required. The resulting archive tree then becomes a copy of the archive tree from that group.

Archive Integrity

The integrity of the intervals stored in an archive is important and must be protected from tampering in order to guarantee the authenticity of certificates. Since one cannot guarantee that any particular server is immune from tampering, the intervals themselves have been designed to prevent undetected tampering:

each interval in the chain has been signed by the previous interval each interval can have a PKI signature that certifies that it was created by a particular server each interval has cross-certification certificates, issued by other servers, which sign the interval, and the intervals that issued these cross-certifications are themselves cross-certified the interval issuing a cross-certification for another interval is archived into an archive tree that is a branch of the archive tree of the interval that is being certified Since intervals and their cross-certifications appear in more than one archive, the integrity of any given archive replica can be validated by verifying the cross-certification certificates using a different archive. An automatic auditing process that cross-authenticates an archive's integrity can also be used.

Publication

Publication refers to the process of making intervals and their cross-certifications available in one or more databases that are:

permanently accessible, even if the issuing organization ceases to exist stored in such a way that they cannot be altered without detection Publication is achieved in the system with the following processes:

an interval and its cross-certifications are published to the root archive in the interval's archive tree, before the interval can become active an archive can be periodically replicated to several servers in order to provide high availability and redundancy against loss Intervals and their cross-certifications are propagated from one archive to another, as defined by the subordinate branches of the intervals archive tree, using the following automatic process:

as an interval is stored in any archive, it is flagged for propagation if there are any branches in the interval's archive tree that occur beneath archive in which the interval is currently being stored periodically, a propagation service forwards all intervals marked in this way to each of the archives that appear beneath the current archive in the interval's archive tree (the propagation flag for the interval is cleared when the interval has been propagated successfully to each of these archives)

this recursive process continues until the interval has eventually been stored in each archive in its archive tree Syslog/Message Log Each server may log activity messages related to its operation in a standardized format. There are several configuration options available to specify where these messages are logged and which, message level in included in the log.

The syslog message-logging configuration is strongly recommended. It enables a server to send messages to any server running a syslog daemon process. With this option and a set of widely available third party tools, server messages can be filtered and routed to a variety of destinations including pagers, e-mail accounts or Internet based messaging services.

Interval Processing Implementation

Interval processing deals with the transition from one interval to another, including cross-certification.

One implementation of this functionality is the Interval Maintenance Subsystem of the ProofMark system. A copy of the Java-based code for Interval maintenance for the Proof-Mark system is appended as Attachment B. Other implementations and other implementations using other programming languages are possible. Although the prior description would be more than sufficient for a person of ordinary skill in the art to assemble and use the system, the code is appended for exemplary purposes only, to show one of a large number of different ways by which the system may be implemented.

The Interval Maintenance subsystem systematically creates new intervals and activates them as needed. An interval represents a period of time within which certifications are issued. Only one interval is active at any particular time and has a start time and stop time and an associated public and private key pair that is used to generate and verify digital signatures. Each interval has a defined duration and is digitally signed by the previous interval. Upon expiration of an interval, a previously prepared interval is activated and the expired interval's private key is destroyed. The interval maintenance subsystem continually repeats this process of creating, activating and destroying intervals. One interval begins immediately after one expires.

The subsystem also interacts with a time subsystem to obtain times and to determine when it's time to create new intervals and activate previously prepared intervals. If the time subsystem fails for any reason, it becomes impossible for the subsystem to create new and/or activate intervals. For security reasons, time gaps between intervals are not allowed. If the time subsystem fails, the interval chain can be broken. In this case, the interval maintenance subsystem will continually attempt to restart itself until either the time subsystem begins functioning or the system is shutdown.

The Interval Maintenance subsystem also provides a client interface, provides recovery measures, interfaces with a message logging subsystem, and interfaces with a security subsystem. Other functions are possible.

Interval Maintenance Subsystem Overview

The Interval Maintenance subsystem comprises classes that collaborate to provide the desired services. With respect and in reading Appendix B, all classes in the subsystem belong to the com.proofspace package. The key classes are as follows: IntervalSI; IntervalChainSI; Server; CrossCertificationBroker; CrossCertifyingGroup; IntervalPublishingBroker; ProofMarkBrokerSI; ReplicatorServlet; CrossCertifierServlet; PublisherServlet; IssuerServlet; and StartupServlet.

A number of exceptions have been defined and are thrown by various components of the subsystem. These exceptions are as follows: CrossCertificationException; IntervalNotReadyException; PublishingException; and ProofSpaceServletException.

Figure 17:
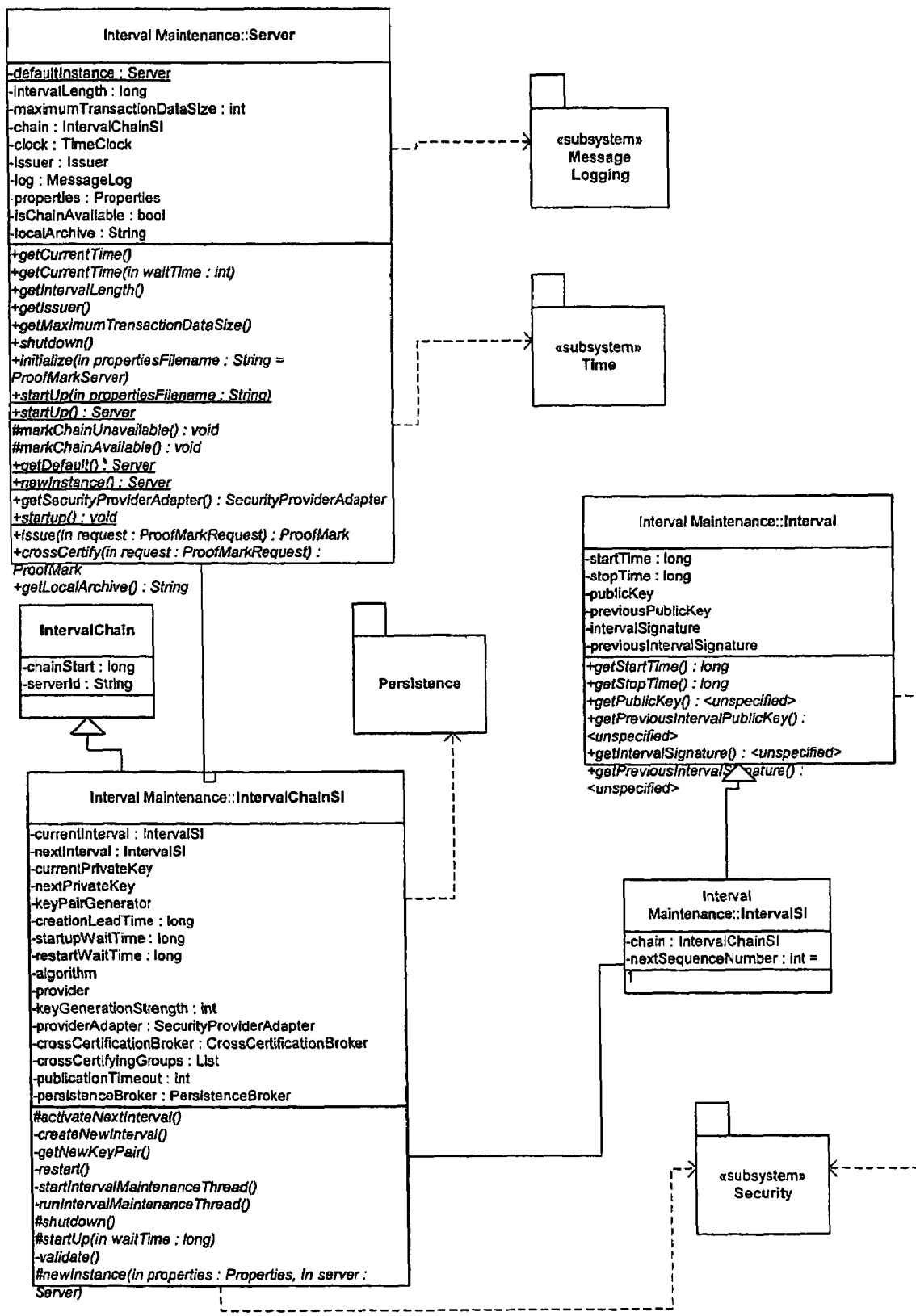
FIG. 17 is a class diagram showing the key classes in the Interval maintenance subsystem for the present system.

The class diagram of FIG. 17 illustrates the key classes in the subsystem and their respective associations with one another.

Figure 18:
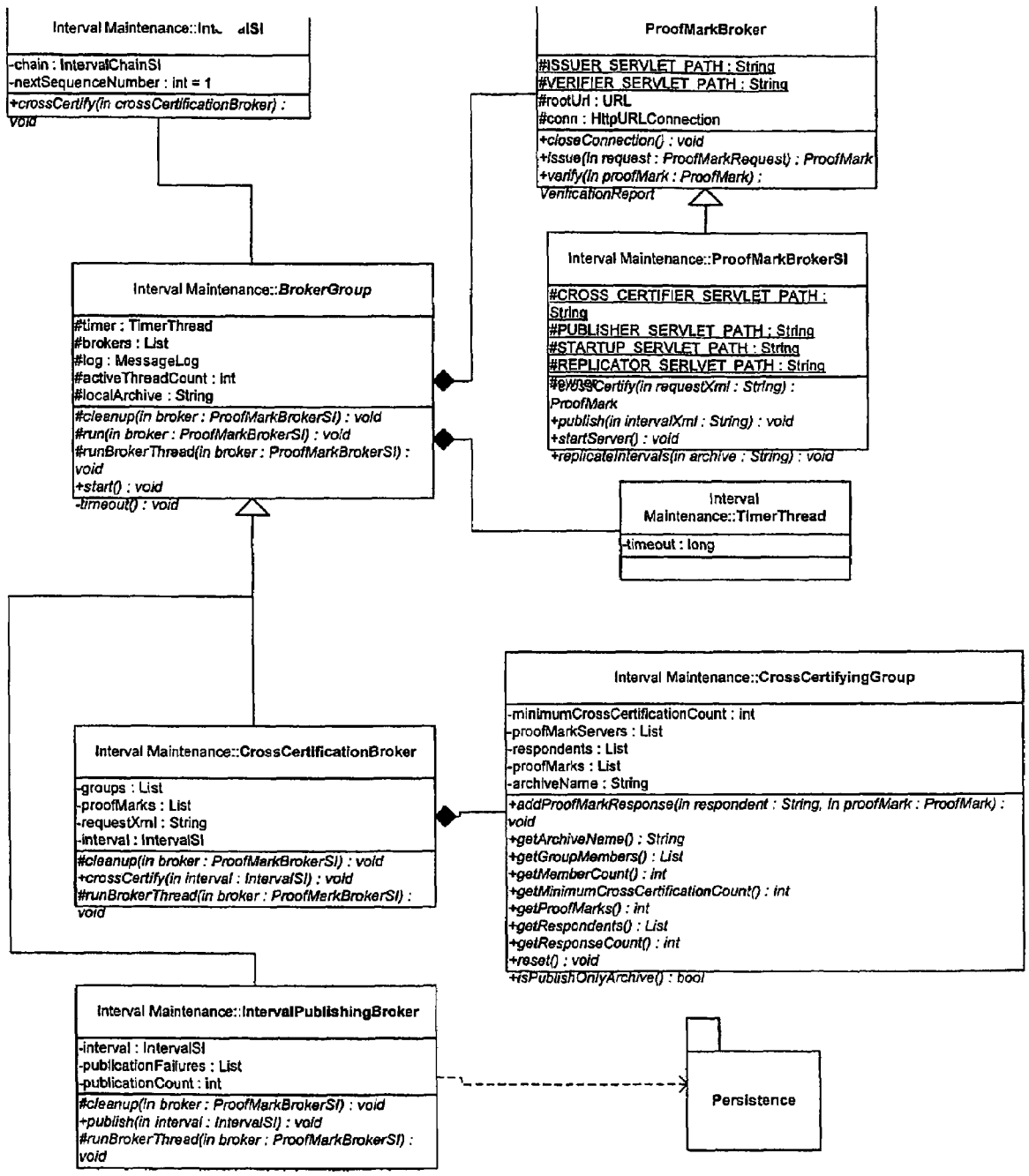
FIG. 18 is a block diagram showing the relationship of the classes involved in cross-certification and the publication of an Interval in association with the present system.
Figure 19:
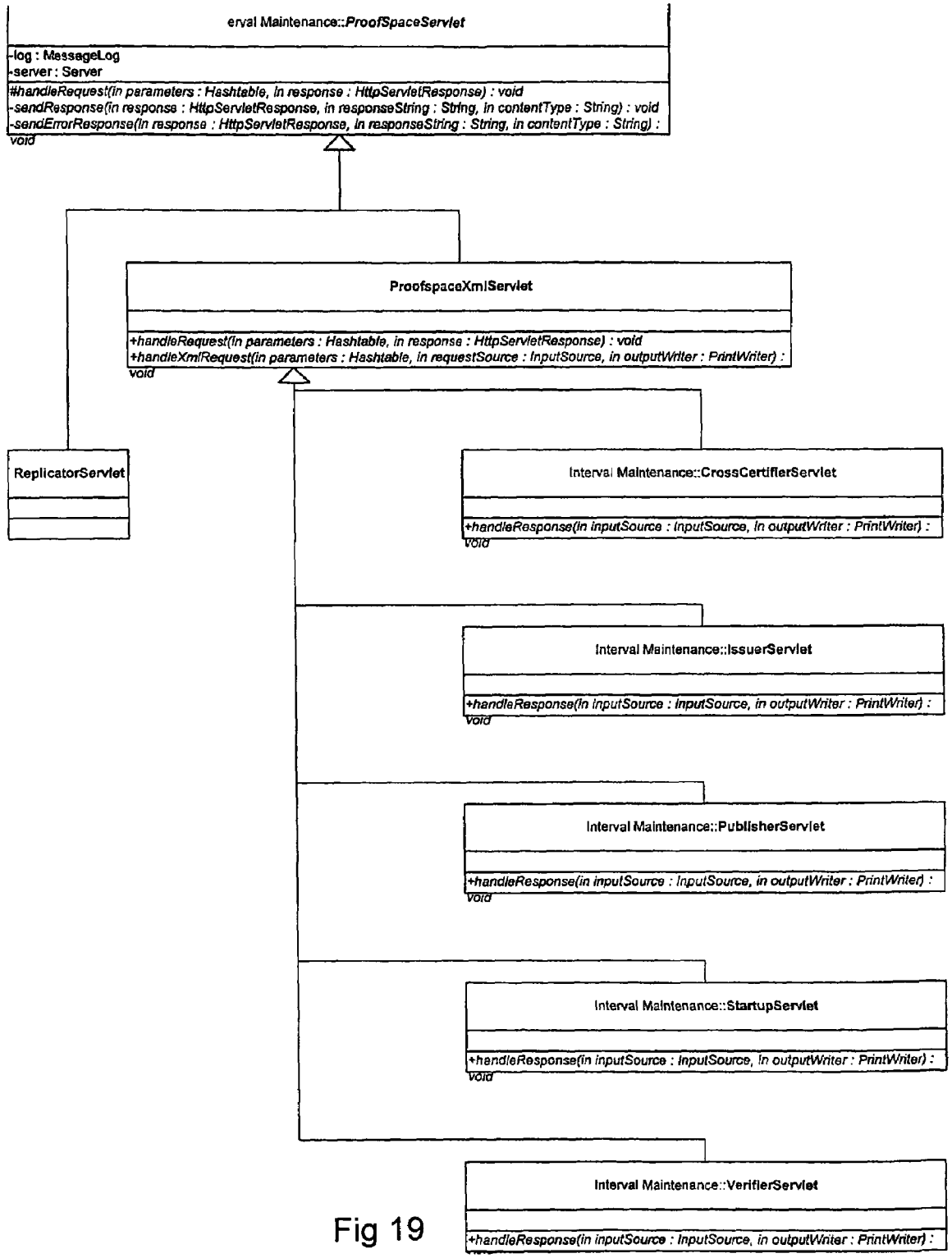
FIG. 19 is a class diagram showing the servlet hierarchy of the present system.

The diagram of FIG. 18 shows the relationship of the classes involved in cross-certification and publication of an Interval. The class diagram of FIG. 19 shows the servlet hierarchy.

Key Classes

Figure 20:
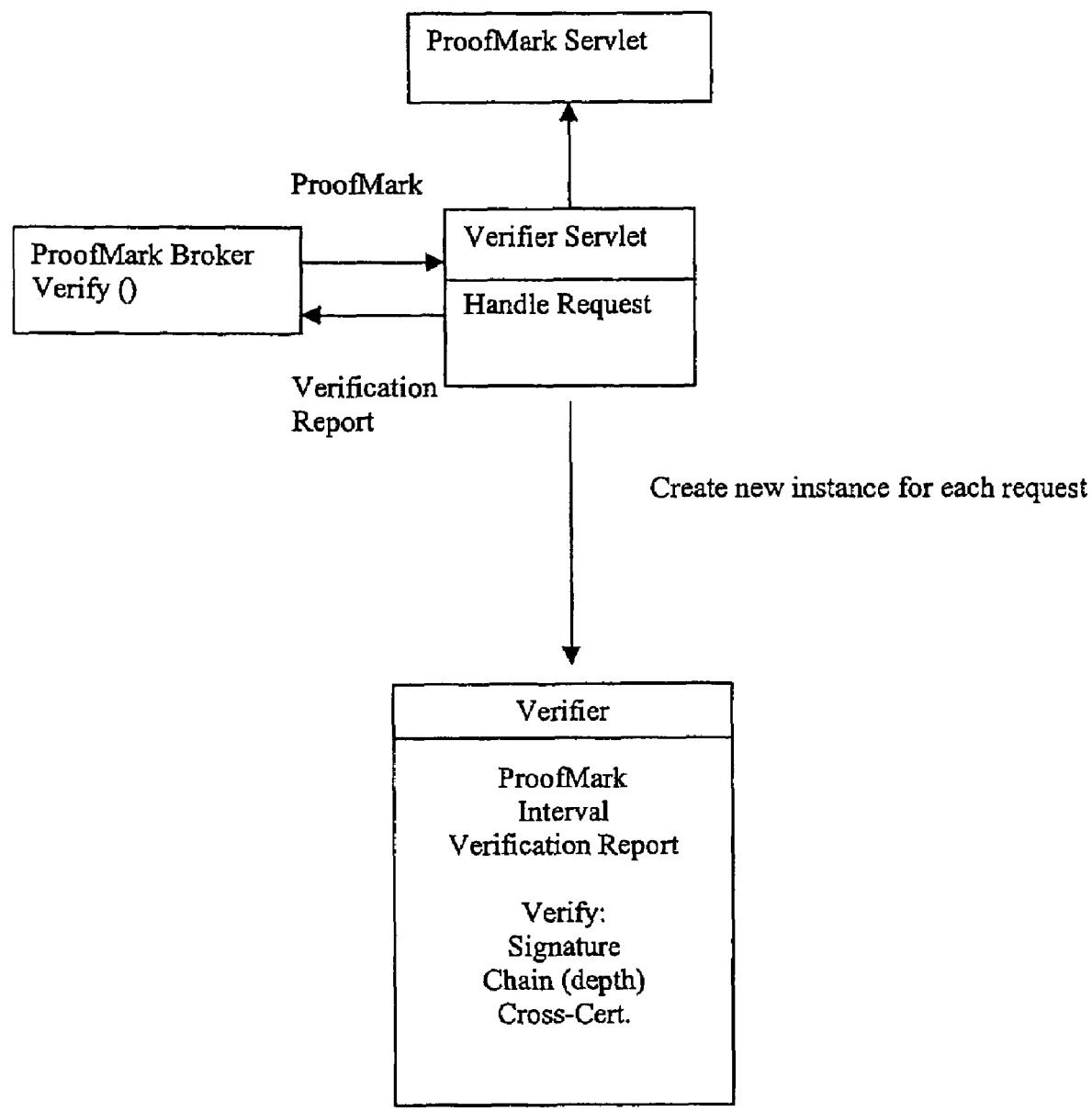
FIG. 20 is a block diagram showing the operation of the key classes of the verification subsystem of the present invention.

Each of the key classes in the subsystem are described below. Each description will contain an overview of the class, services that it provides and a listing of its relevant methods. FIG. 20 shows the operation of the key classes.

com.proofspace.IntervalSI

IntervalSI is an extension of com.proofspace.client.Interval and is the server implementation (SI) of the interval class. An interval represents some period of time during which ProofMarks are issued. Each interval has a specified start and stop time and is active only from it's specified start time and expires precisely at its stop time. It also contains a PublicKey. The IntervalChain keeps track of each interval's associated PrivateKey. The PrivateKey is not accessible from the Interval and only exists from the point the interval is created until it expires. IntervalChainSI is declared as a package friendly, final class to minimize the external exposure to private keys. Upon expiration of the Interval, its PrivateKey is destroyed by the chain. The integrity of an Interval is provided by having another Interval digitally sign its PublicKey, start and stop times. This will ensure that an Interval's PublicKey, start time and stop time have not been altered. Additionally, each Interval retains a reference to the previous interval's digital signature thereby creating a chain of intervals. This chain of intervals is managed by the IntervalChainSI.

Depending upon the server's configuration, each interval may be cross certified with zero or more groups of other ProofMark servers. The cross-certification servers are organized into groups by their archive. Each group of servers therefore must share the same archive. The server will publish each interval to each unique archive in the cross-certification groups that have a different archive than its own. Finally, the server may also store and potentially mark for propagation an interval if a local archive exists.

There are three main services provided by an IntervalSI:

Digitally sign the next interval in the chain using its PrivateKey;

Hand out a unique sequence number assigned to each ProofMark issued within the interval; and Cross-certification, publication and persistence.

Therefore, there are few public methods available when interacting with an IntervaSI. All of the other public methods are inherited from its superclass, interval. These inherited public methods provide access to the interval's state (i.e. start time, stop time, PublicKey, etc.).

public synchronized int getNextSequenceNumber( )

This method returns the next sequence number for the interval. Each ProofMark is issued a unique sequence number.

void sign(IntervalSI Interval, Signature signer

This method accepts the next IntervaSI that has just been created and a signature that has been initialized with the Interval's PrivateKey. The signing interval retrieves the bytes representing the Interval to be signed and digitally signs them using the specified signer. This signature is stored in the specified interval along with the signing interval's PublicKey, digital signature and previous interval's digital signature.

public boolean isInSafeMode( )

This method answers whether or not the interval is in "safe mode." Safe mode is a scenario where an interval was unable to obtain the minimum number of intra-archive cross-certifications. Once the interval is activated, it can only issue cross-certifications from other servers within its own archive. All other issue requests are rejected.

void turnOnSafeMode( )

This method is used exclusively during cross-certification and turns on safe mode. Once safe mode has been turned on, it remains on until the interval has expired.

void CrossCertifyPublishAndStore(CrossCertifieationBroker broker) throws CrossCertificationException This method handles the cross-certification, publication and persistence of the Interval. The interval collaborates with the CrossCertificationBroker and IntervalPublishingBroker to accomplish these tasks. If any of the groups are publish only groups, they do not participate in cross-certification.

Cross-Certification

If the minimum number of inter-archive cross-certifications are not obtained, the Interval is created in "safe mode." This means that once the interval is activated, it can only issue cross-certifications from other servers within its own archive. All other issue requests are rejected.

If the minimum number of inter-archive cross-certifications are not obtained, an exception is thrown, thereby breaking the interval chain and causing the server to attempt restart. If the minimum number of inter-archive cross-certifications for a particular group is 0, the archive for that group is added to the interval's archive tree anyway so that it is published anyway.

Publishing

The interval is published to each external archive. If all publication attempts fail, an exception is thrown, thereby breaking the interval chain and causing the server to attempt restart. If at least one publication attempt succeeds and a local archive exists, the remaining publication failures if any, are used to make propagation entries for the interval in the persistent store. Another process is responsible for actually propagating the entries.

The interval is stored in the local archive if the server is configured with a local archive. Each failed publication will result in a corresponding propagation entry for the interval.

com.poofspace.IntervalChainSI

IntervalChainSI is the server implementation (SI) of the interval chain class. IntervalChainSI represents a chain of intervals. It is responsible for managing this chain. Its main purpose is to periodically create new intervals and then activate them as necessary. Each server creates a single interval chain that it used to manage Intervals. The interval chain constructs and starts a separate thread that spends much of its time sleeping. It periodically wakes up to create new intervals and activate readied intervals when one expires. There is some overhead in creating an interval since this entails generating a new public/private key pair, obtaining cross-certifications, publishing and persisting. Depending upon the algorithm used and the strength of the keys, this key generation process could be time consuming. Cross-certification and publication are time bounded. That is they are provided a fixed amount of time to complete. If they fail to complete within this specified amount of time, the task is aborted. Depending upon the server's configuration, this may result in a restart condition.

As mentioned previously, each interval is active for some specified amount of time. The thread started by interval chain must wake up in enough time to create and ready a new interval. Creating a new interval includes setting the new interval's start and stop time, generating its public and private keys, having the current (active) interval digitally sign it using the previous interval's private key, obtaining cross-certification certificates from zero or more other servers, publishing the interval to one or more archives and making the interval persistent. After the creation process has completed, the interval chain stores this interval until it is ready to become active. The thread then sleeps until the current interval is expired. It then wakes up and activates the previously prepared interval. Upon expiration of an interval, the chain destroys the private key of the expiring interval. The thread continues this process, sleeping until it's time to create the next interval.

The main services provided by interval chain are creating and preparing intervals; activating intervals at the appropriate time, destroying the private key of the expired interval; issuing a certificate; Issuing a cross-certification certificate; starting and running a separate thread that performs the actual creation and activation of intervals; and detecting failures and providing restart services to keep the server running and starting a new chain of intervals, if necessary.

If IntervalChainSI is declared as package friendly, no classes outside of the com.proofspace package interact with it. Therefore, there are no public methods.

Synchronized void activateNextInterval( )

ActivateNextInterval activates the next interval that was previously created and prepared. The current interval is replaced and its private key destroyed. The separate thread that continuously sleeps and wakes up to create and activate intervals calls this method when necessary. It is sometimes necessary to activate an Interval based upon a client request. If a request for the issuance of a certificate specifies a time that is beyond the stop time of the current interval, the readied interval is activated during the request. Therefore, the thread may wake up and find that there is no interval to activate.

Synchronized Create New Interval (synchronized private IntervalSI createNewInterval( ))

Create New Interval creates a new interval and puts it in a ready state. The Interval is not used until it is activated. The separate thread awakes periodically and creates an interval. Upon creation, the thread will go back to sleep until it is time to activate the interval. Creating an interval involves setting the start and stop time (the start time is set to the stop time of the current interval), generating a new public/private key pair, asking the current interval to sign the newly created interval, obtaining cross-certification certificates from zero or more servers, publishing and persisting.

ProofMark crossCertify (ProofMark crossCertify(ProofmarkRequest proofMarkRequest) throws StaleTimeException, IssuanceException CrossCertify issues a ProofMark as a cross-certification of another server's interval. If the current interval is in safe mode and the request is from a server outside of the issuing server's local archive, the request is rejected.

ProofMark Issue (ProofMark issue(ProofMarkRequest proofMarkRequest) throws StaleTimeException, IssuanceException The method Issue issues a certificate based upon a client request.

Private synchronized Restart (private synchronized void restart( )

Restart is executed if the interval chain detects a failure. Failure sources can be the time subsystem, inability to obtain cross-certification certificates, publication or persistence. The IntervalChainSI attempts to restart only when it becomes evident that the current chain of Intervals will be broken (a new interval cannot be created in time). Restart involves creating a new chain of intervals and will not complete successfully until the problems are resolved. Once restart has completed, normal operation resumes. Since this method is synchronized, it prevents new certificates from being issued (due to the lock). To prevent client requests from blocking, the method sets a flag in the server to indicate the unavailability of the IntervalChainSI. Any client requests received during a restart are automatically rejected without causing the client to wait. Messages are logged to a Message Logging subsystem which will most likely cause some sort of external notification (i.e. paging, e-mail) to occur.

Private void Start Interval Maintenance Thread (private void startIntervalMaintenance Thread( )

Start Interval Maintenance Thread starts and runs the separate thread that sleeps and systematically wakes up to create and activate intervals.

Private void Validate (private void validate( )

Since the process validate is user configurable, it is possible that invalid configuration parameters can be specified. During server startup, the configuration parameters are checked for validity. If any configuration errors are identified, they are logged and the server startup fails.

com.proofspace.Server

Server is the client interface to the Interval subsystem. Server exhibits singleton behavior, but doesn't prohibit multiple instances from being created. Since server is the client interface to the Interval subsystem, it stands to reason that it is responsible for starting and initializing the subsystem on demand. The server is typically started through the StartupServlet. A server can be configured issue certificates. If the server is non-issuing, no interval chain is started. Non-issuing servers can be used as publication and/or verification servers. However, since no interval chain exists, they cannot be used as cross-certification servers. Server maintains a reference to both the Message Logging subsystem and Time subsystem so that other components within the subsystem can easily utilize the services of these other subsystems.

The main services provided by Server includes start and initialize (and shutdown) the Interval maintenance subsystem, provide an interface to the Time subsystem so that the current time can be retrieved, provide an provide an interface to the Message Logging subsystem so that message logging can be performed, issue ProofMarks based on client requests; and issue cross-certification ProofMarks from other servers.

public static Server getDefault( ) throws StartupException

Get Default allows a client to obtain a reference to the server. If no instance of server exists, an exception is thrown.

public static Server startup( ) throws StartupException

The method Startup starts the server. Depending upon the configuration, an interval chain may be started as well. An exception is thrown if startup fails for any reason. If an exception is thrown, no server instance is created.

public ProofMark crossCertify(ProofMarkRequest request) throws IssuanceException CrossCertify issues a certificate as a cross-certification of an interval from another server. It simply delegates to the interval chain.

public long getCurrentTime( )

GetCurrentTime returns the current time from the Time subsystem. The time is always in GMT.

public long getCurrentTime(int millisecondsToWait)

GetCurrentTime may also return the current time from the Time subsystem, waiting up to the specified number of milliseconds. The wait time is used only if the Time subsystem has failed. If a time is not retrieved from the Time subsystem within the specified wait time, an exception is thrown.

public Issuer getIssuer( )

GetIssuer returns the Issuer of certificates. It contains identifying information about the organization that is issuing certificates.

public int getMaximumTransactionDataSize( )

GetMaximumTransactionDataSize returns the maximum transaction data size in bytes. This attribute is a configuration parameter and might be used by a client in determining whether or not to issue a certificate. The intended use is to prevent clients from submitting unreasonably large transaction data, thereby effecting server performance.

public String getLocalArchive( )

GetLocalArchive answers the local archive for the server or null if the server has no local archive.

public ProofMark issue(ProofMarkRequest request) throws IssuanceException

The method Issue issues a certificate based upon a client request. It delegates to the interval chain.

com.proofspace.CrossCertificationBroker

The Class CrossCertificationBroker is a concrete subclass of BrokerGroup and is responsible for obtaining cross-certification certificate from other servers. The crosscertification configuration is specified in the server's configuration and results in zero or more CrossCertifyingGroup instances. Each group consists of one or more servers. All servers in a group share the same archive. The configuration also specifies the minimum number of cross-certifications that must be obtained from each group. A connection is obtained with each configured server in its own thread. The entire Cross-certification process is given a specified amount of time to complete. If a timeout occurs, the broker kills all of the remaining threads and uses only the cross-certifications that were successfully obtained within the timeout period. If the minimum number of cross-certifications are not obtained for each group, an exception is thrown. The one exception to this rule is if the only failing cross-certification group is within the server's local archive, no exception is thrown, but safe mode is turned on for the Interval being cross certified.

The main services provided by the CrossCertificationBroker are:

Obtain cross-certifications from the configured groups of servers in separate threads; and Validate that the required number of cross-certifications have been obtained.

public CrossCertificationBroker(List groups, int crossCertificationTimeout) throws CrossCertificationException The constructor CrossCertificationBroker is used to instantiate a broker with a list of groups with which to cross certify and a timeout value (in milliseconds). Each group consists of one or more servers.

public void crossCertify(IntervalSI Interval) throws CrossCertificationException CrossCertify initiates the cross-certification process. Upon successful receipt of all cross-certifications or a timeout, a validation step occurs. The broker checks to ensure that the minimum number of cross-certifications were obtained for each group. All thread management is handled in the superclass.

protected void runBrokerThread(ProofMarkBrokerSI broker)

RunBrokerThread attempts to obtain a single cross-certification certificate from another server. This method will be called once per server defined in each cross-certification group in a separate thread. If this method completes before the cross-certification timeout expires, the obtained certificate will be added to the interval. Otherwise, the thread will be killed and any subsequent results ignored. If a certificate is obtained, a sanity check is performed against the certificate to ensure that it is within the acceptable time bounds. The requesting server measures the time it took to obtain the certificate. The accuracy of the requesting server is subtracted from the start time and the accuracy of the issuing server is added to the stop time to account for acceptable inaccuracies of both server's time sources. This provides an acceptable time bound to which the certificate's timestamp is compared. Failure results in a thrown exception. The actual act of cross-certification is delegated to the ProofMarkBrokerSI specified on the method call.

com.proofspace.CrossCertifyingGroup

The CrossCertifyingGroup class represents a group of servers to which the requesting server will cross certify. Each group shares a common archive. Each group specifies a minimum number of cross-certifications that must be obtained. Exactly what happens if the minimum requirements are unmet is dependent upon whether the group is within the server's local archive or not. If it is and the minimum requirements are unmet, the Interval being cross certified is placed into safe mode. In all other failure cases, an exception is thrown causing the server to attempt restart. The groups are actually created during startup and are owned by the IntervalChainSI. Each group is also used as a container for obtained ProofMarks during the cross-certification process. It is possible to create a group with no individual server members. In this case; the group must specify an archive name and a minimum certification count of 0. A group configured in this way is known as a publish only group. That is, it defines an external archive that is used to publish with, not cross certify with.

The main services provided by CrossCertifyingGroup are:
Keeping track of the group members;
Keeping track of the minimum number of cross-certifications for the group;
Act as a holder of obtained certificates during cross-certification; and
Be able to determine which servers have/have not responded during cross-certification.

public Cross certifying Group (List serverNames, Int minimumCertificationCount, String archiveName)

The CrossCertifyingGroup constructor is used to create a CrossCertifyingGroup instance for the specified list of server names. The group must obtain the specified minimum number of cross-certifications and shares the specified archive name.

public void addProofMarkResponse(String serverURL, ProofMark proofMark)

Add ProofMarkResponse is used during cross-certification to add an obtained crosscertification certificate. The serverURL is also specified so that the group can know which servers have responded and which have not.

public String getArchiveName( )

GetArchiveName answers the name of the archive that is shared by all members of the group. The archive name is a URL to which intervals are published and is specified in terms of hostname:port where hostname can be an IP address or DNS hostname and the optional port is the port number on which the server is listening for publication requests. This attribute is configured in a file (ProofMarkServer.properties).

public List getGroupMembers( )

GetGroupMembers answers a List of Strings, each of which is a server URL. The URL is specified in terms of hostname:port where hostname can be an IP address or DNS hostname and the optional port is the port number on which the server is listening for crosscertification requests. This attribute is configured in a file (ProoMarkServer.properties).

public int getMemberCount( )

GetMemberCount answers the number of group members.

public int getMinimumCrossCertificationCount( )

GetMinimumCrossCertificationCount answers the minimum number of Crosscertifications that must be obtained for this group. This attribute is configured in a file (ProofMarkServer.properties).

public List getProofMarks( )

Get ProofMarks answers a List of certificate (ProofMarks) that have been obtained during this cross-certification attempt. There will be at most, one certificate for each group member.

public List getRespondents( )

Get Respondents answers a List of Strings, each of which is a server URL that has responded with a certificate during this cross-certification attempt. The URL is specified in terms of hostname:port where hostname can be an IP address or DNS hostname and the optional port is the port number on which the server is listening for cross-certification requests.

public int getResponseCount( )

Get Response Count answers the number of certificates that have been obtained during this cross-certification attempt.

public boolean isPublishOnlyArchive( )

Is Publish Only Archive answers whether or not the group is configured as a publish only archive.

public void reset( )

Reset clears the collection of certificates and servers that responded during the last cross-certification attempt. This enables the groups to be reused over multiple cross-certification attempts.

com.poofspace.IntervalPublishineBroker

The class Interval Publishing Broker is a concrete subclass of BrokerGroup and is responsible for publishing the interval to each publication archive. The publishing broker is also responsible for making the interval persistent if the server has a local archive. Each CrossCertifyingGroup shares a common archive. This archive is also known as the publishing archive and is a URL that identifies a server to which a publishing request is made. A connection is obtained with each publishing server in its own thread. The entire publication process is given a specified amount of time to complete. If a timeout occurs, the broker kills all of the remaining threads and determines whether at least one publication request was successful within the timeout period. If not, an exception is thrown resulting in the server attempting restart. If publication succeeds and the server has a local archive, the Interval is stored using the persistence subsystem. A propagation entry will be made for each publication archive that failed to publish the interval. A separate process is responsible for actually propagating the Interval. The broker only marks the Interval as propagatable to each failed publication archive. Servers that cross certify only within it's own archive do not publish.

Services provided by the InteralPublishingBroker include publishing the Interval to each cross-certification group's shared archive and persisting the Interval and providing the ability to mark as propagatable.

public void publish(IntervalSI Interval) throws PublishingException

Publish initiates the publication process. The publication archives are obtained from the specified interval by publishing to all branch root archives of the interval's archive tree. All thread management is handled in the superclass.

protected void runBrokerThread(ProofMarkBrokerSI broker)

Run Broker Thread attempts to publish the interval to one publishing server. This method will be called once per server obtained from the interval's archive tree in a separate thread. Failure to publish to at least one archive results in a thrown exception. The actual act of publication is delegated to the ProofMarkBrokerSI specified on the method call.

public void storeAndPropagate(intervalSI Interval) throws PersistenceException

Store And Propogate uses the persistence subsystem to store the interval and marks the interval for propagation to each failed publication archive.

com.proofspace.ProofMarkBrokerSI

The class ProofMarkBrokerSI is the server side implementation of the ProofMarkBroker. A ProofMarkBroker handles all communication between the requesting server and another remote server. Communication is usually performed by invoking a servlet on the remote server using the HTTP protocol. The server side implementation provides the ability to cross certify with, publish to and/or start the server on a single remote server.

public ProofMarkBrokerSI(String rootUrlString, Object owner) throws MalformedURLException The constructor ProofMarkBrokerSI is used to create an instance of a ProofMarkBrokerSI with the server specified in the rootUrlString. The caller may optionally pass an owner that can be used for some specific purpose.

public ProofMark crossCertify(String requestXml) throws CrossCertificationException, IOException CrossCertify invokes the cross-certification servlet (CrossCertifierServlet) on the remote server and sends the specified XML request and answers the resulting.

public String crossCertifyXml(ProofMarkRequest request) throws CrossCertificationException, IOException CrossCertifyXml performs the same function as Cross-Certify except that it accepts a ProoflMarkRequest and answers an XML representation of the resulting certificate.

public Object getOwner( )

GetOwner answers the owner of the broker that was specified on the constructor.

public void publish(String IntervalXml) throws PublishingException, IOException

Publish invokes the publishing servlet (PublisherServlet) on the remote server and sends the specified XML as the HTTP request.

Public ZipInputStream replicateIntervals(String latestIntervals) throws ReplicationException, IOException ZipInputStream invokes the replicator servlet (ReplicatorServlet) on the replication source server and sends the latest intervals persistent in the replicator's persistent store.

public String startServer( ) throws StartupException, IOException

StartServer invokes the startup servlet (StartupServlet) on the remote server and answers a String that is the response from the remote server.

com.proofspace.CrossCertifierServlet

CrossCertifierServlet is a concrete subclass of com.proofspace.ProofSpaceXmlServlet and communicates directly with the Server and calls it's crossCertify method. The main service provided by the CrossCertifierServlet is to obtain a cross-certification certificate from the server based upon the XML request sent via HTTP.

protected void handleRequest(Hashtable parameters, InputSource requestSource, PrintWriter outputwriter) throws ProofSpaceServletException HandleRequest reads the input stream from the HTTP request and uses an XML parser to parse the request. The server's CrossCertify method is invoked and an XML representation of the resulting certificate is sent back to the caller via an HTTP response.

com.proofspace.PublisherServlet

PublisherServlet is a concrete subclass of com.proofspace.ProofSpaceXmlServlet and uses the persistence subsystem to store (and potentially mark for propagation) the interval. The main service provided by the PublisherServlet is to publish the interval provided as part of the HTTP request.

protected void handleRequest(Hashtable parameters, InputSource requestSource, PrintWriter outputWriter) throws ProofSpaceServletException HandleRequest reads the input stream from the HTTP request and uses an XML parser to parse the request into an Interval. The interval is stored and marked for propagation to all branch root archives of the publishing server.

com.proofspace.ReplicatorServlet

ReplicatorServlet is a concrete subclass of com.proofspace.ProofSpaceXmlServlet and uses the persistence subsystem to retrieve and send Intervals back to the replicator. The Intervals are sent using a ZipOutputStream so that compression is achieved since the data volumes can be substantial.

protected void handleRequest(Hashtable parameters, HttpServletResponse response) throws ServletException, IOException HandleRequest reads the parameters, determines which intervals to send back to the replicator and sends the HTTP response to the replicator.

com.proofspace.StartupServlet

StartupServlet is a concrete subclass of com.proofspace.ProofSpaceXmlServlet and starts a server if it is not already started. Any exceptions that occur during startup are returned to the caller via HTTP. The main service provided by the StartupServlet is to start the default Server.

protected void handleRequest(Hashtable parameters, InputSource requestsource, PrintWriter outputWriter) throws ProofSpaceServletException HandleRequest starts the default Server, catching any exceptions that occur and sending them back to the caller.

Configuring the Internal Maintenance Subsystem

The Interval Maintenance subsystem is configurable. Configuration parameters are specified in a properties file that is read on Server startup and is used to initialize the Interval Maintenance subsystem.

Subsystem processes

There are a number of processes that occur during the operation of the Interval Maintenance subsystem including: Subsystem startup, restarting, creating a new interval, activating an interval, issuing a ProofMark, issuing a cross-certification ProofMark and publishing an interval.

Subsystem Startup

The Interval Maintenance startup process is initiated by the invocation of the StartupServlet. The Server initializes itself, initializes and obtains a reference to the Time subsystem, initializes and obtains a reference to the Message Logging subsystem and initializes and optionally obtains a reference to the interval chain. A server can be configured as non-issuing in which case no interval chain is created.

Starting the interval chain requires signs the first available interval the previous interval, which is also signed by it's previous Interval. Therefore, starting a new chain requires two "bootstrap" Intervals to be created first. The third Interval is actually the first one available for use during the issuance of certificates. This interval chain startup process is detailed as follows:

The first "bootstrap" interval is created with its current start time obtained from the Time subsystem. A Public/Private key pair is then generated for the "bootstrap" Interval. Key pairs are generated by a java.security.KeyPairGenerator. The interval chain obtains and keeps a reference to the key pair generator since it is used each time a new interval is created. The interval is cross certified with other servers as specified in the server's configuration. Successful cross-certification indicates that the interval was cross-certified, published and persisted according to the server's configuration. The first interval is never activated and is used only to sign the second "bootstrap" interval. The first "bootstrap" interval's stop time is then set to the current time, also obtained from the Time subsystem. The interval preparation time is calculated by determining the amount of elapsed time between the instantiation of and complete preparation of the interval. The preparation time for each of the first two bootstrap and initial valid intervals. The maximum preparation time is used as a basis in determination of the interval creation lead-time. This is calculated by taking the maximum interval preparation time and adding, for example, 25%.

The second "bootstrap" interval is created with its current start time set to the stop time of the first "bootstrap" interval.

A Public/Private key pair is then generated for the second "bootstrap" interval. The second "bootstrap" interval's stop time is then set to the current time obtained from the Time subsystem. The first "bootstrap" interval is then used to digitally sign the second "bootstrap" interval. The second "bootstrap" interval is never activated either and is used only to sign the third interval. Cross-certification is performed. This third Interval is the first interval that is available for the issuance of certificates.

The third interval is created using the interval chain's createNewmterval( ) method. This method creates a new interval, initializing its start time to the previous (second "bootstrap") interval's stop time. Its stop time is set to its start time plus the defined interval length. The Public/Private key pair is generated, the new interval is digitally signed by the previous (second "bootstrap") interval and cross-certification, publication and persistence occur.

The interval chain then makes this third interval the current interval and creates and starts a separate thread to maintain the chain.

Restarting

Restarting is a service that the Interval Maintenance subsystem automatically performs when a failure is detected. Sources of failure include Time subsystem failures, cross-certification, publication and persistence failures. The system strives not to break chains. A new interval must have a start time that matches the previous interval's stop time. If an interval cannot be created in time, the server must break the chain and attempt to restart, thereby starting a new chain. The subsystem continually tries to restart until either it is successful (the failure is resolved) or the subsystem is manually shutdown. Alerts are issued each time the subsystem tries to restart and also each time it fails to restart.

The restart process begins by notifying the Server that the interval chain is unavailable. This allows the Server to immediately reject any client requests against the interval chain until the problem has been corrected so that clients can be immediately notified as opposed to blocking indefinitely.

Creating a New Internal

Intervals are created and prepared some period of time before they are activated. The creation and activation process is controlled by the thread created and started during interval chain startup. Each interval is active for some specified amount of time. It is important that an interval be ready when it is activated. For this reason, intervals are created and prepared before they are actually needed. The interval creation process can be time consuming due primarily to the expense of generating a Public/Private key pair, cross-certification, publication and persistence. An Interval awaiting activation is stored in the interval chain's nextInterval instance variable, while its corresponding private key is stored in the interval chain's nextPrivateKey instance variable. Similarly, the current Interval is stored in the interval chain's currentInterval instance variable, while it's corresponding private key is stored in the interval chain's currentPrivateKey instance variable.

The Interval Maintenance Thread

The thread that is started by IntervalChain during startup exists solely to create and activate Intervals. It spends most of its time sleeping and wakes up periodically to work. The following summarizes the life of the thread:
1. Sleep;
2. Wake up and create a new Interval;
3. Sleep;
4. Wake up and activate the previously created Interval;
5. Go back to step 1 and repeat this until a restart condition arises or the Server is shutdown.

Although much of its life is spent sleeping, it must wake up at fairly precise times. The sleep times are calculated so that the thread doesn't sleep too late or wake up too early. The sleep time in Step 1 is calculated before the loop starts. It is calculated by subtracting the sum of the current time and calculated Interval creation lead-time from the stop time of the current Interval. For example, assume the following:

Current time (in milliseconds from the epoch)= 940708033170

Current Interval stop time (in milliseconds from the epoch)=940708333170

Interval creation lead-time (in milliseconds)=30000

Step 1 sleep time=270000 milliseconds

In the previous example, each time the thread executed step 1, it would sleep for 270,000 milliseconds before waking up to create a new Interval. After creating the Interval in Step 2, the thread goes back to sleep. Similarly, the sleep time must be calculated so that it sleeps precisely the amount of time it needs to. The sleep time in Step 3 is calculated by subtracting the current time from the current Interval's stop time and adding some small factor to help ensure the thread sleeps just beyond the current interval's expiration time. Continuing with the previous example, assume the following after the thread woke up to create a new interval and went back to sleep:

Current time (in milliseconds from the epoch)= 940708323 170

Current interval stop time (in milliseconds from the epoch)=940708333170 Additional factor (in milliseconds)=10

Step 3 sleep time=10010 milliseconds

Creating the Interval

An interval exists within a chain of intervals. This chain is established by creating a link between two intervals. The following are the components that link two Intervals together:

1. Each interval's start time is equal to the stop time of the previous interval.
2. Each interval keeps a reference to the previous interval's public key
3. Each interval is digitally signed by the previous interval's private key, resulting in a digital signature that is kept by the interval.
4. Each interval keeps a reference to the previous interval's digital signature that was signed by the previous interval's private key.

It is this complex linking of Intervals that creates a chain. Consequently, creating an interval requires several steps as follows:

1. The interval's start time is calculated by obtaining the current interval's stop time.
2. The interval's stop time is calculated by adding the interval length property to the interval's start time.
3. A new public/private key pair is generated using the interval chain's key pair generator that was created during startup.
4. A new interval is created and initialized with its start time, stop time and public key.
5. The interval chain stores the interval's private key for use in signing the next interval that will be created. An interval does not keep a reference to its private key since the interval is passed around. The interval chain keeps the private key as an extra measure of protection.
6. The interval chain creates a Signature using the current interval's private key.

7. The interval chain asks the current interval to sign the newly created (and not yet activated) interval by passing it the new interval and the Signature.
8. The current interval asks the new interval for a byte representation of itself suitable for signing and asks the Signature to sign the bytes.
9. The current interval stores the digital signature just produced, its digital signature (created by the current interval's previous interval) and the current interval's public key in the new Interval.
10. The new interval attempts to cross certify itself with zero or more servers. Cross-certification to all cross certifying servers occurs simultaneously in separate threads with each thread obtaining a single cross-certification certificate.
11. The new interval is then published to the branch root archives of the interval.

This is the shared archive from each configured cross-certification server group.

12. If the requesting server has a local archive, the new interval is stored and marked for propagation to any servers that failed to publish.

Activating an Internal

Activating an interval maybe accomplished in one of two ways. As previously mentioned, this task is part of the Interval Maintenance thread. Since the activation of a new interval is crucial, the subsystem cannot count solely on the Interval Maintenance thread to activate an awaiting interval. One or more client requests could be made after the current interval has expired, but before the sleeping thread has awaken to activate the previously prepared interval. To prevent this from happening, a client request might also cause the activation of an interval. In this scenario, the thread can see that there is no interval to activate, so it simply goes back to sleep until it's time to create a new interval. In both cases, the activation of an interval occurs in a synchronized method. In any case, activating an interval entails the following:

1. Check to see if there is an Interval to activate. This is necessary in case the interval has already been activated. If so, there is nothing else to do.
2. Obtain the current time from the Time subsystem and use it to make sure that the current Interval has expired. If not, there is nothing else to do.
3. Make the previously created interval the current interval.
4. Destroy what is now the previous interval's private key.
5. Make what is now the current interval's private key the current private key.
6. Null out the nextInterval and nextPrivateKey instance variables.

Issuing a Certificate (Proofmark)

This process is described from the point the request enters the server via the IssuerServlet. An issuing server's main function is to issue certificate. The process begins when the IssuerServlet is invoked. The client sends an HTTP request that contains an XML representation of an ProofMarkRequest. The contents of the request are the data to be certificated. The following steps are followed during the issuance of a certificate:

1. The servlet parses the incoming XML and instantiates a ProofMarkRequest.
2. The servlet asks the server to issue a certificate passing the ProomarkRequest as an argument.
3. If the server is currently capable of issuing, it delegates the request to the interval chain.
4. The interval chain gets the current time and gets the interval for that time. This may cause an interval flip.
5. The interval chain then creates a certificate based upon the ProofMarkRequest and signs it with the current interval's private key.
6. The issued certificate is then returned all the way back to the servlet which renders the ProofMark as XML and sends it back to the client via HTTP.

Issuing a Cross-Certification Certificate (Proofmark)

This process is described from the point the request enters the server via the CrossCertifierServlet. One function of an issuing server's main function is to issue certificates. Cross-certification certificates are just like any other issuance request except that they follow a slightly different path through the server. The process begins when the CrossCertifierServlet is invoked. A server requesting cross-certification sends an HTTP request that contains an XML representation of a ProofMarkRequest. The content of the request is the XML representation of the interval being cross certified. The following steps are followed during the issuance of a cross-certification certificate:

1. The servlet parses the incoming XML and instantiates a ProofMarkRequest.
2. The servlet asks the server to cross certify the interval contained in the ProofMarkRequest passing the ProofMarkRequest as an argument.
3. If the server is currently capable of issuing, it delegates the request to the interval chain.
4. If the interval is in safe mode and the request is from a server in the server's local archive, the cross-certification certificate is issued. If the request is from a server outside of the server's local archive, an exception is thrown.
5. The interval chain gets the current time and gets the Interval for that time. This may cause an Interval flip.
6. The interval chain then creates a certificate based upon the ProofMarkRequest and signs it with the current interval's private key.
7. The issued certificate is then returned to the servlet which renders the certificate as XML and sends it back to the client via HTTP.

Publishing an Internal

This process is described from the point the request enters the server via the PublisherServlet. Publication is slightly different than issuance in that an issuing server is not required. That is, it is possible to configure a server that does not issue certificates. Instead, it publishes and/or verifies certificates. This provides the flexibility to offload the burden of publication and/or verification to other servers that aren't responsible for issuance. The process begins when the PublisherServlet is invoked. A server requesting publication sends an HTTP request that contains an XML representation of an interval. The following steps are followed during the publication of an interval:

1. The servlet parses the incoming XML and instantiates an interval.
2. The servlet then obtains the local archive from the server, locates the archive in the interval's archive tree and obtains the branch root archives of that.
3. The servlet asks the configured PersistenceBroker to store the interval in the local archive passing the Interval and the branch root archives as arguments.
4. The broker stores the interval and marks it for propagation to each archive in the list. The ensures that the propagation process will move the interval toward the public record.

Verification Subsystem Implementation

This section describes how Cross-certification come into play during verification. Verification is the process whereby previously issued certificates (ProofMarks) are verified and validated. This involves:

Checking the signature on the certificate

Verifying the interval and its public key in the archive

Verifying the interval chain, by verifying the previous intervals and the signatures of an interval made by the previous interval.

Recursively verifying the cross-certifications for a Interval, which are certificates issued by another server where the data being signed is the first server's interval.

Creating a verification report which contains the results of this process, and returning this report to the client.

The verification process starts when a client issues a verification request via a ProofMarkBroker, supplying a previously issued certificate. This request is sent by the client to a server that is expected to have a record of the certificate's issuing interval in its archive. The certificate's archive tree lists the archives where the interval is published, so the verification request is normally sent to one of these hosts.

Description of Key Classes

Figure 15:
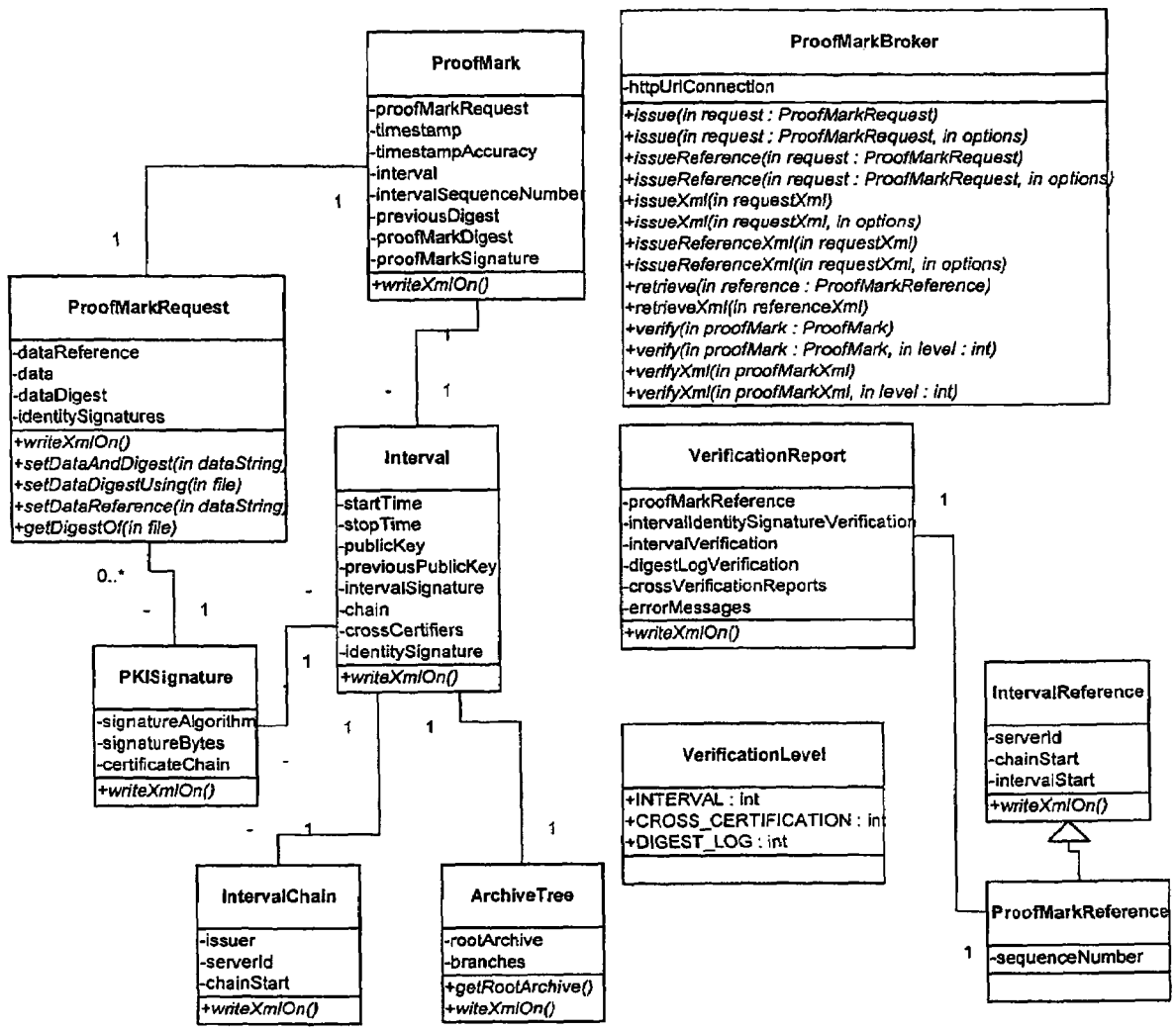
FIG. 15 is a class diagram of the Client API.
Figure 16:
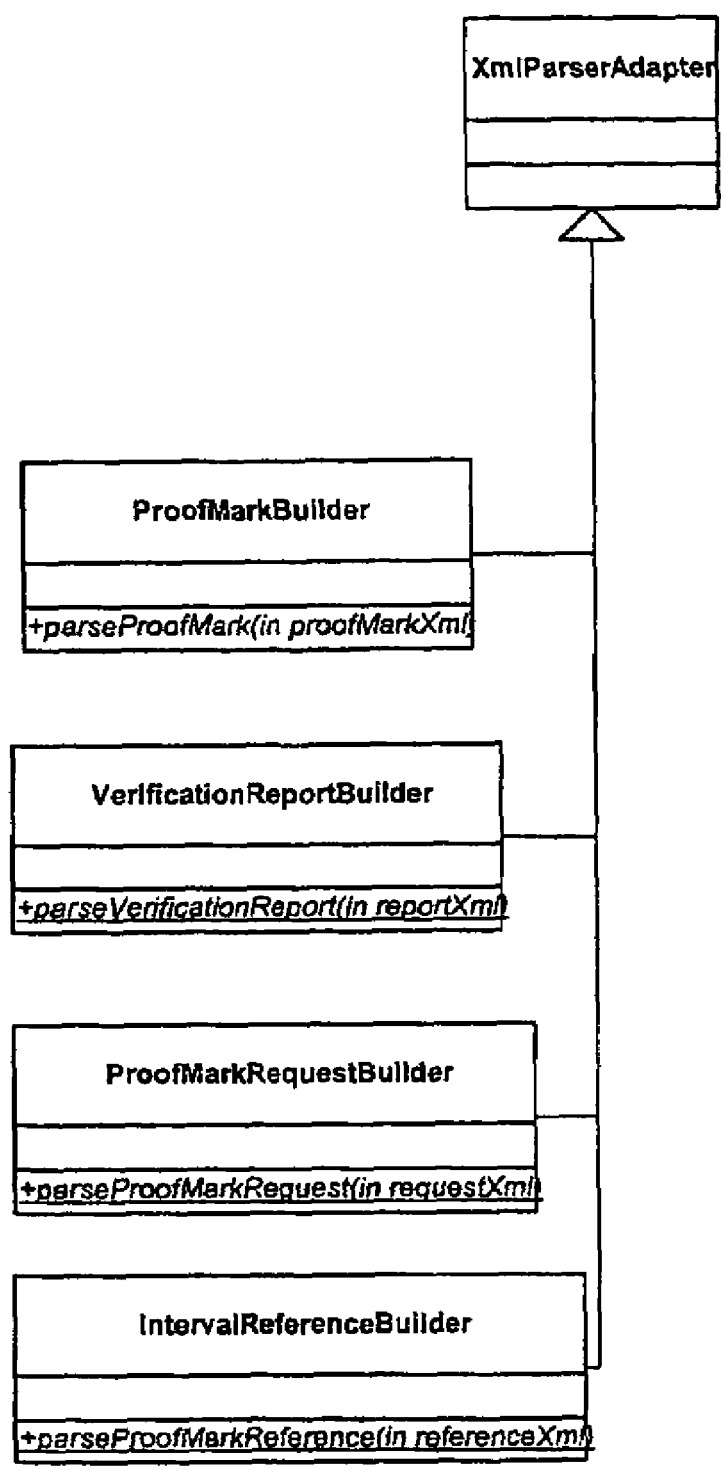
FIG. 16 shows the builder class model for the Client API.

Key classes in the subsystem is individually described. See FIG. 15. Each description will contain an overview of the class, the key services that it provides and a listing of its public methods.

com.proofspace.VerifierServlet

VerifierServlet is a subclass of ProofMarkServlet. A single instance is created by the servlet engine which will then process multiple parallel requests for verification.

protected void handleRequest(InputSource requestsource, PrintWriter outputwriter) throws ProofSpaceServletException HandleRequest is run to receive each verification request. The ProofMark is received by parsing the requestSource stream. Next, an instance of Verifier is constructed with the certificate and sent the verifyo message. The returned verification report is written as XML on the outputwriter.

com.proofspace.Verifier

Verifier class is created for each verification request. Its responsibility is to carry out the verification process.

An outline of the algorithm (for "complete" verification") is as follows. "Basic" verification does not verify cross-certifications.

1. Verify the ProofMark
  a. Set the recursionTree to the interval's archive tree (of the certificate).
  b. Verify the signature on the certificate.
  c. Verify the interval chain to depth(1)
    1. Recover the interval from the archive record and verify that it matches the current interval.
    2. Check the signature from the previous interval.
    3. Verify the server identity signature
  d. Verify the cross-certification certificate for the interval
    1. For cross-certifications where issuing archive is different from the interval's archive, recursively verify (starting at step 1.b) the cross-certification certificate—if the issuing interval is below the certified interval in the recursionTree.
    2. For other cross-certifications, verify without recursing subsequent cross-certifications.

com.proofspace.client.VerificationReport

An instance of VerificationReport is returned for each certificate that is verified. In the case where cross-certifications of a certificate's interval are verified, corresponding verification reports are included recursively in the certificate's verification reports.

Indicia

The system and method encodes certificates using any graphically interpretive symbology. For example, 2-dimensional barcode symbology or data glyfs may be used. Other examples are possible. This will allow a superficially uniform, machine-readable graphical representation for all certifications.

As discussed above, a certificate, in an exemplary embodiment, consists of a certificate containing information which can be encoded in ASCII. An XML DTD has been defined which allows XML representations of certifications to be sent over networks using the HTTP protocol, among others. However, an XML document, with its numerous markup tags and (in the case of certifications) ASCII representations of binary hashed data, may be deemed by some to be aesthetically displeasing. A graphical "logo," which may also be referred to as an "indicia" or "insignia," may be made to contain the certification's data. This provides an attractive way of storing and transporting certifications outside of computer systems.

Attributes of an Exemplary Embodiment

The following attributes are preferred, but certainly not essential, for the Indicia:

The indicia's visual appearance from several feet away should be roughly the same regardless of the content of the certificate it encodes.

Proofspace software should generate an indicia for a given certificate.

Indicia generation should take place on the server; it should not require software components (plug-ins, ActiveX controls, etc.) to be installed on client machines. Thus, the indicia may be displayed, for example, in web browsers, and allow printing of the indicia or storing of the digital representation of the indicia for later use.

Indicia should be generated in a standard image representation format (e.g., gif or .tiff).

In some applications, the size of the indicia may be variable and have a number of different sizes. Obviously, for a given size indicia, there is necessarily a limit on the size of certificate (i.e., the amount of transaction data) that can be represented by the indicia.

Many of the indicia should be printable with a computer. For some users, it may also be useful to have printed indicia able to be scanned using a flatbed scanner, allowing the computer to recover the information encoded in the indicia.

It is anticipated that a user may electronically process a .gif/.tiff-encoded indicia, and recover the information encoded in the indicia.

One exemplary approach to handle the encoding and decoding of certifications as graphical indicia is described further below as it relates to the ProofMark system.

The ProofMark indicia is graphically designed so that it can be rendered as a collection of squares arranged in a Cartesian grid. Alternatively, any shape of any size can be used. The principle would be similar to that used in bit-mapped fonts, albeit on a larger scale. As in bitmapped fonts, some squares would be "black", and some would be white (blank). Each "black" square would actually be occupied by a 2D barcode, for example, that encoded a piece of the ProofMark's data. However, other machine readable interpretable graphics are possible. The minimum size of each "black" square will be a function of the symbology chosen and the amount of ProofMark data that is to be encoded in a indicia of a given overall area. The smaller the "black"

squares relative to overall indicia area, the more visually appealing we can make the design. Therefore, the symbology used, in one exemplary embodiment, offers fairly high density while still being printable and scannable by available computer printers and scanners.

In an exemplary embodiment, certain sections (e.g., squares) of the indicia are black. To recover a ProofMark certification, "black" squares are traversed left-to-right, top-to bottom, decoded individually, and the results concatenated together to restore the original Prooflark's XML data.

The example shown in FIG. 23 illustrates this approach. The ProofMark indicia has been designed to look like the letter "P". Each black square is represented by two rows of identical letters. In the implementation this would be an encoded barcode.

In one exemplary embodiment, in order to recover ProofMark data from a scanned bitmap, reader finds the origin (e.g. the upper left corner) of the Prooflark indicia, and determine the scale being used (if multiple insignia sizes have been elected as an option. Alternatively, the application that recovers the ProofNark information from the indicia may also simply query the user as to what size or scale indicia is being scanned).

Alternatively, the system may use an arbitrarily complex and attractive "logo" which carries no ProofMark information. Instead, the background surrounding the logo (and possibly in interior regions of the logo that are white or near-white) may be used to encode the necessary ProofMark information.

Figure 29:
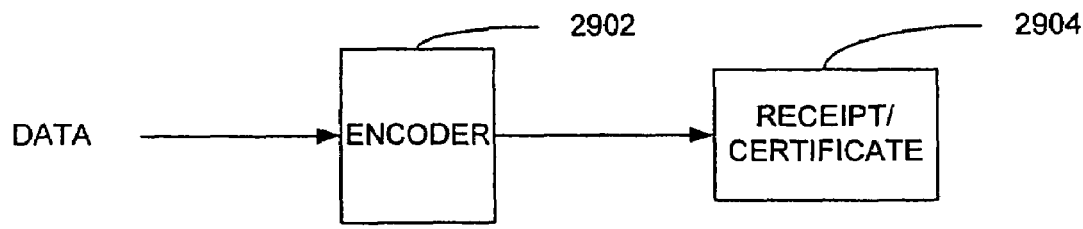
FIG. 29 is a block diagram of the encoder.
Figure 30:
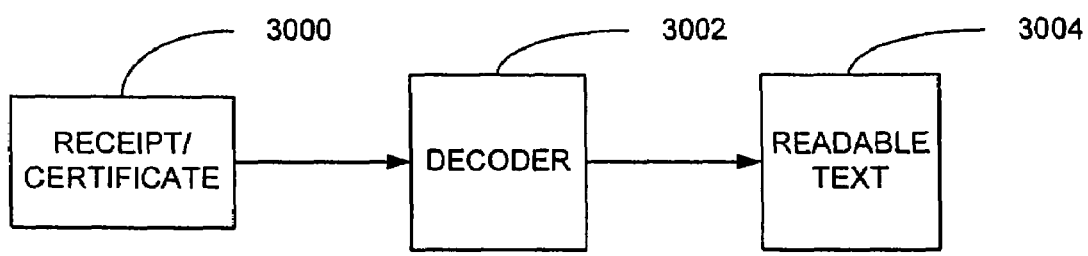
FIG. 30 is a block diagram of the decoder.

Referring now to FIG. 29, data is input to an encoder 2902 which encodes and creates the indicia onto a receipt or certificate 2904. Referring now to FIG. 30, a receipt or certificate 3000 containing indicia is decoded by a decoder 3002 into readable text 3004.

Figure 24:
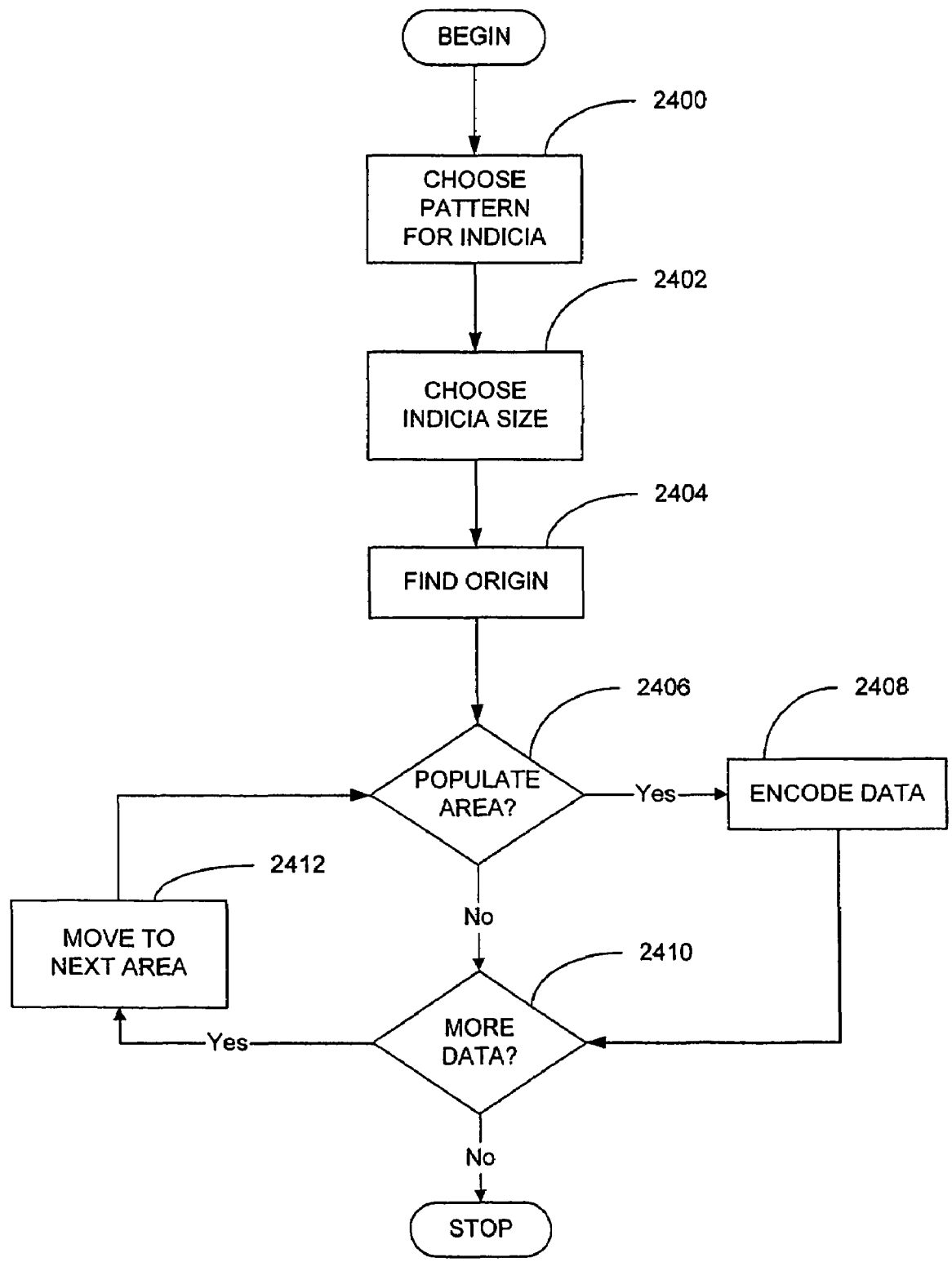
FIG. 24 is a flowchart of indicia encoding.

Referring now to FIG. 24, at step 2400, a pattern is chosen for the indicia. The pattern can be any suitable pattern, preferably, of a recognizable shape. For example, the letter "P" can be used. See FIG. 23. Next, at step 2402, the size of the indicia is selected. Then, at step 2404, the origin for the indicia is selected. This can be anywhere in the indicia, for example, in the upper left corner of the indicia. At step 2406, it is determined whether an area in the indicia is to be populated (encoded) with information. The area can be of any shape and dimension. It can be of a fixed shape and dimensions or a variable shape and dimensions or any combination of the above.

If the answer at step 2406 is affirmative, at step 2408, the area is encoded with data. Control then continues with the execution of step 2410. If the answer at step 2406 is negative, then control continues with step 2410. At step 2410, it is determined if there is more data to encode. If the answer is affirmative, control passes to step 2412 where the system moves to the next area to populate. Control then continues with step 2406. If the answer at step 2410 is negative, then execution ends.

Figure 25:
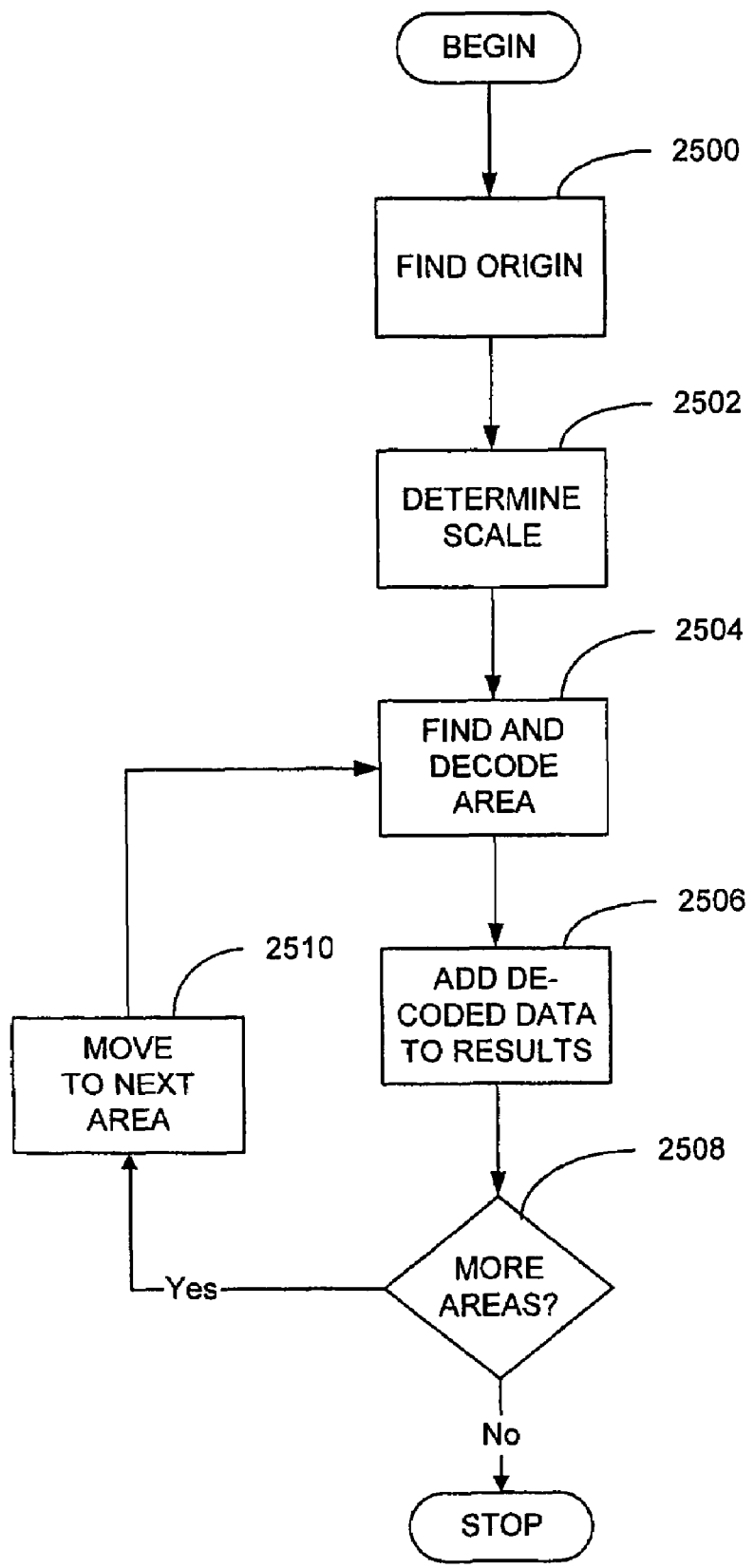
FIG. 25 is a flowchart of indicia decoding.

Referring now to FIG. 25, at step 2500 the origin is located. For example, the origin may be in the upper-left section of the indicia. Then, at step 2502, the correct scale for the indicia is determined. Then, at step 2504, the system finds and decodes the current area. At step 2506, the decoded data is added to the results. Next, at step 2508, it is determined whether there is more area to decode. If the answer at step 2508 is affirmative, then at step 2510, the system moves to the next area to decode and execution continues at step 2504. If the answer at step 2508 is negative, then execution ends.

Figure 26:
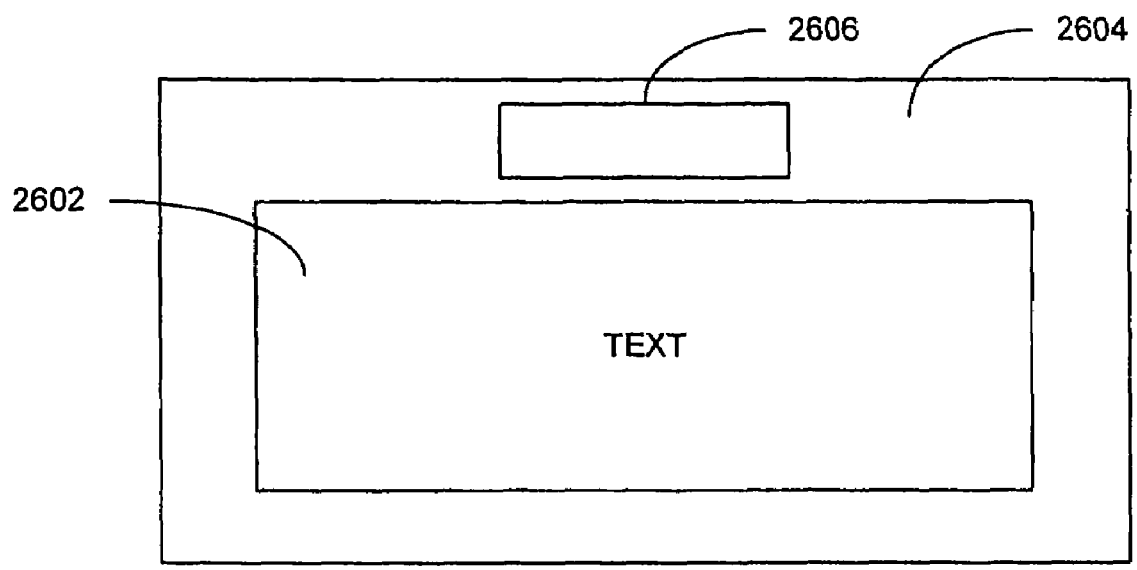
FIG. 26 is a certificate with an indica.

Referring now to FIG. 26, a textual area 2602 is surrounded by a margin 2604. The margin includes the encoded data in an indicia area 2606. The area 2606 may be of any size.

Figure 27:
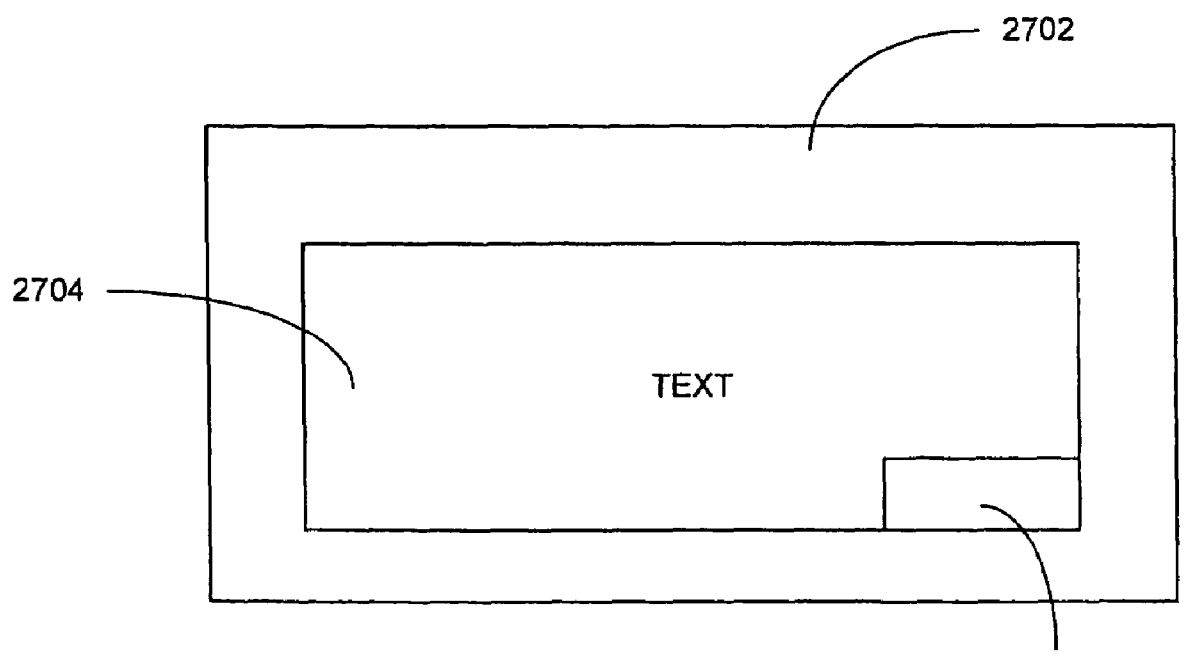
FIG. 27 is a certificate with an indica.

Referring now to FIG. 27, a textual area 2704 is surrounded by a margin 2702. The textual area 2702 includes a small indicia area 2706 where the encoded data is contained. The area 2706 may be of any size.

Figure 28:
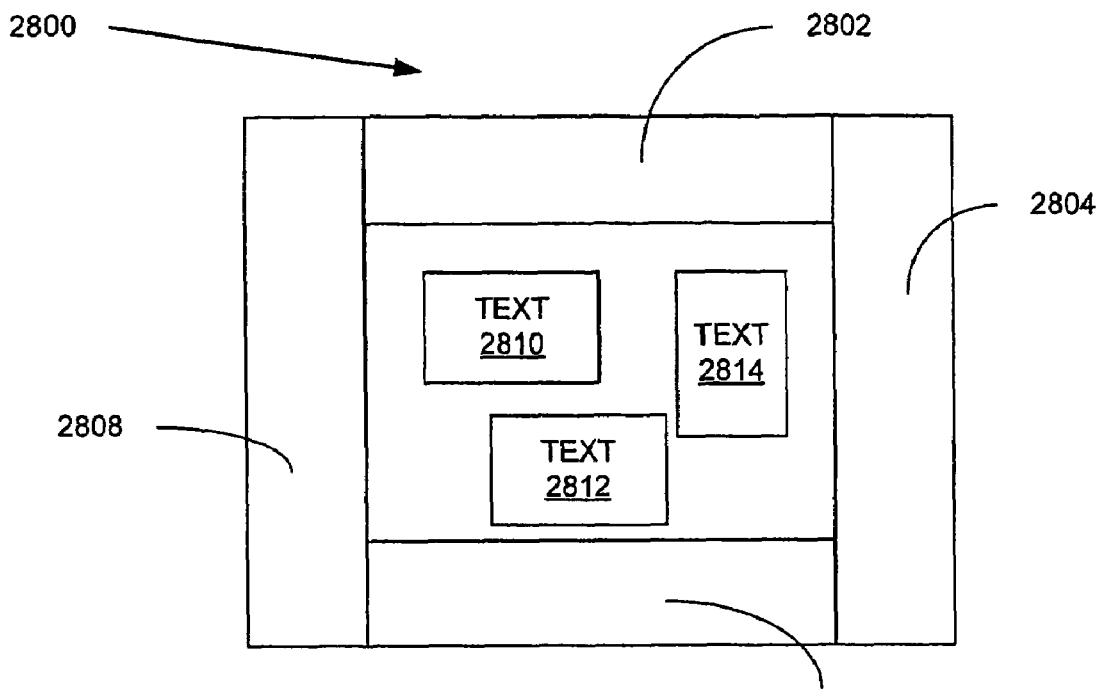
FIG. 28 is a certificate with an indicia.

Referring now to FIG. 28, a receipt 2800 comprises areas 2802, 2804, 2806, and 2808 of encoded data and textual areas 2810, 2812, and 2814.

As will be understood by those familiar with the art, the invention may be embodied in other specific forms without departing from the spirit or essential characteristics thereof. Likewise, the particular naming and division of the modules, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of these. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, wherever a component of the present invention is implemented as software, that component can also be stored as program code on a computer readable medium (e.g., an optical or magnetic medium), or instantiated as a software portion in memory of a general purpose programmable computer system. Furthermore, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer readable medium containing a computer program product for providing security with respect to who provided digital data at what time, the computer readable medium comprising:
program code for performing a serially chained certification process comprising:
a) forming a first interval certification at a first server including the server's identification, the start time of an interval chain in Coordinated Universal Time, the start time of the interval in Coordinated Universal Time, the shop time of the interval, a public key for the interval, a digital signature for the interval, signed by a previous interval's private key, and a digital signature for the interval, signed by the interval's private key;
b) upon expiration of the first interval, destroying its private key;
c) continuing steps (a) and (b) for second, third, and following intervals so that intervals are cross-chained with other servers to form a widely witnessed, temporal web of signed intervals of time; and
encoding certification information in graphical form to form an indicia that relates to the authenticity of the document.

2. The computer program product of 1 further comprising:
program code for decoding the indicia to authenticate a document.

* * * * *